US007143933B2

(12) United States Patent
Uematsu et al.

(10) Patent No.: US 7,143,933 B2
(45) Date of Patent: Dec. 5, 2006

(54) SAFE FOR DEPOSITS, METHOD OF CONTROL OF SAFE FOR DEPOSITS, DEPOSIT SYSTEM UTILIZING SAFE FOR DEPOSITS, AND METHOD FOR SAME

(75) Inventors: Tsutomu Uematsu, Kawasaki (JP); Takahiko Tanaka, Kawasaki (JP); Kazushi Watari, Kawasaki (JP)

(73) Assignees: Fujitsu Limited, Kawasaki (JP); Nippon Express Co., Ltd., Tokyo (JP)

(*) Notice: Subject to any disclaimer, the term of this patent is extended or adjusted under 35 U.S.C. 154(b) by 358 days.

(21) Appl. No.: 10/811,156

(22) Filed: Mar. 29, 2004

(65) Prior Publication Data

US 2005/0077347 A1 Apr. 14, 2005

(30) Foreign Application Priority Data

Oct. 10, 2003 (JP) ............................. 2003-351622

(51) Int. Cl.
*G06K 17/60* (2006.01)

(52) U.S. Cl. ...................................................... 235/379

(58) Field of Classification Search ................ 235/379, 235/487, 381, 382; 902/13; 194/206
See application file for complete search history.

(56) References Cited

U.S. PATENT DOCUMENTS 5,673,333 A * 9/1997 Johnston ..................... 382/137
5,684,285 A * 11/1997 Faes et al. .................. 235/449
5,944,163 A * 8/1999 Keith et al. ................. 194/206
6,502,746 B1 * 1/2003 Do et al. .................... 235/379
6,885,281 B1 * 4/2005 McGunn et al. ............. 340/5.5
2004/0210515 A1 * 10/2004 Hughes ....................... 705/39

FOREIGN PATENT DOCUMENTS

JP 55-97661 7/1980
JP 5-44896 6/1993
JP 2000-99823 4/2000

* cited by examiner

*Primary Examiner*—Ahshik Kim
*Assistant Examiner*—Edwyn Labaze
(74) *Attorney, Agent, or Firm*—Armstrong, Kratz, Quintos, Hanson & Brooks, LLP

(57) ABSTRACT

A safe for deposits is inserted a sealed bag containing cash and houses the bag for preventing illicit actions and theft even when scrutiny processing is outsourced. A bag insertion portion into which a cash bag is inserted, cassette housing portion which houses a recoverable cassette, and control portion are provided to the safe to perform recovery merely through cassette attachment and removal operations, so that the danger of failure to recover a cash bag (bag left behind) is prevented. And information on the housed cash bag is stored in the cassette for checking the cash bag.

24 Claims, 18 Drawing Sheets

SAFE FOR DEPOSITS, METHOD OF CONTROL OF SAFE FOR DEPOSITS, DEPOSIT SYSTEM UTILIZING SAFE FOR DEPOSITS, AND METHOD FOR SAME

CROSS-REFERENCE TO RELATED APPLICATIONS

This application is based upon and claims the benefit of priority from the prior Japanese Patent Application No. 2003-351622, filed on Oct. 10, 2003, the entire contents of which are incorporated herein by reference.

BACKGROUND OF THE INVENTION

1. Field of the Invention

This invention relates to a safe for deposits, a method of control of the safe for deposits, and a deposit system utilizing the safe for deposits and a method for same, for use in making deposits to a financial institution of sales proceeds at retail stores, large-scale stores and other stores. In particular, this invention relates to a safe for deposits, a method of control of the safe for deposits, and a deposit system utilizing the safe for deposits and a method for same, for use in consigning sales proceeds to a consignment company unrelated to the store, and depositing same to a financial institution.

2. Description of the Related Art

In retail stores, large-scale stores and similar, there is a need to deposit and store cash, gift certificates, and other sales proceeds, and to deposit such sales proceeds with a financial institution. In such deposit processing within a store, security is necessary within the store when storing cash and similar on the store premises, leading to the possibility of the frequent occurrence of theft. Moreover, deposit processing within a store necessitates a safe with a counting function, leading to increased store operating costs.

A method may be adopted in which the nighttime safe of a bank is utilized, so that after the bank is closed, sales proceeds are placed in a special bag, which is inserted into the nighttime safe (see for example Japanese Utility Model Laid-open No. 5-044896 and Japanese Patent Laid-open No. 55-097661). However, in recent years such nighttime safes have become less common, due to issues of bank profitability and other factors, so that often there may exist no nighttime safes in the vicinity of a store. Consequently, and given the frequent occurrence of thefts in recent years, nighttime deposits have become dangerous.

In light of this situation, a method is being adopted in which a portion of the deposit processing at the store is consigned to security and transport companies, and sales proceeds are transported from the store to a financial institution. FIG. 21 explains a conventional sales proceeds deposit processing system at a store. At a retail store or other store 100, a POS (Point of Sale) terminal 102 with a cash drawer is provided in the sales space, and merchandise is registered, and sales are processed. In a back yard of the store 100, a bookkeeping employee 104 performs bookkeeping of the sales cash and gift certificates within the cash drawer of the POS terminal 102, and for example organizes one day's worth of cash and gift certificates and places these in a safe for transport or similar.

The store 100 consigns transport of this cash to the financial institution 110 to a certain cash transport company 120 which reliably transports cash, and a safe for transport, into which the cash has been placed, is transported to the financial institution 110. At the financial institution 110, a cash counting device and computer are used to perform scrutiny 112 of the cash transported by the transport company 120, and deposit data is stored in a customer file 114. Further, money changing of coins and similar necessary for retail sales is performed, and the changed money is transported to the retail store 100 by the transport company or by a financial institution employee.

In this technology of the prior art, the danger involved in cash transport is reduced, but there is a need to perform bookkeeping in the store 100, such as comparing sales data from the POS terminal with the actual cash amount and similar; in particular, when numerous POS terminals are installed in the store, the burden involved can be substantial.

For this reason, a method is conceivable in which a safe is installed in the store, and the collection of cash from each POS terminal and placement in a bag, placement of the bag inside the safe, and transport of the cash bag within the safe are entrusted to a security and transport company, thereby outsourcing bookkeeping tasks. However, during recovery of cash and transport by the consignment company, there is the danger of loss of the cash bag.

Also, because the wrong bag may be placed in the safe or other problems may occur, there may be impediments to recovery of cash bags. Hence it becomes necessary after all to manage cash bags at the store 100.

SUMMARY OF THE INVENTION

Hence an object of this invention is to provide a safe for deposits, method of control of a safe for deposits, and a deposit system and method utilizing safe for deposits, which make possible secure deposits even when bookkeeping tasks are outsourced.

Another object of this invention is to provide a safe for deposits, method of control of a safe for deposits, and a deposit system and method utilizing safe for deposits, which enable automatic checks for losses at the time of cash bag recovery and transport, even when bookkeeping tasks are outsourced.

Still another object of this invention is to provide a safe for deposits, method of control of a safe for deposits, and a deposit system and method utilizing safe for deposits, to prevent impediments at the time of cash bag recovery even when bookkeeping tasks are outsourced.

In order to achieve these objects, a safe for deposits of this invention, into which a sealed bag containing cash is inserted and which houses this bag, has a bag insertion portion having a receiving portion which receives the inserted bag and a reader which reads information of a storing portion of the bag in the receiving portion; a cassette housing portion which houses a replaceable cassette, having a storing portion and which holds a bag inserted into the receiving portion; and, a control portion which judges whether the bag can be received by means of the information read by the reader of the insertion portion, and which places the receivable bag in the cassette. And the control portion writes information of the placed bag, in the storing portion of the cassette.

A control method of this invention is a method of control of a safe for deposits into which a sealed bag containing cash is inserted and which houses this bag, and has a step of reading information of a storing portion of the bag inserted into a bag insertion portion which receives the bag; a step of judging, based on the read information, whether the bag can be received; a step of placing the receivable bag in a cassette having a storing portion; and, a step of writing the information of the placed bag, in the storing portion of the cassette.

A deposit system of this invention is a deposit system using a safe for deposits into which a sealed bag containing cash is inserted and which houses this bag, and has a safe for deposits having a bag insertion portion having a receiving portion which receives the inserted bag and a reader which reads information of a storing portion of the bag in the receiving portion; a cassette housing portion which houses a replaceable cassette having a storing portion and places therein the bag inserted into the receiving portion; and a control portion which judges whether the bag can be received based on the information read from the reader of the bag insertion portion, and which places the receivable bag in the cassette and writes information for the placed bag, in the storing portion of the cassette, and a scrutiny processing device which reads the information of the storing portion of the transported cassette and the information of the storing portion of the bag within the cassette, and which performs scrutiny processing.

Further, a deposit processing method of this invention has a step of reading information of a storing portion of a sealed bag containing cash which has been inserted into a bag insertion portion which receives the bag; a step of judging, based on the read information, whether the bag can be received; a step of placing the receivable bag in a cassette having a storing portion; a step of writing information of the placed bag, in the storing portion of the cassette; and a scrutiny processing step of reading the information of the storing portion of the cassette upon removal and the information of the storing portion of the bag within the cassette and of performing scrutiny processing.

In this invention, it is preferable that the bag insertion portion further have a shutter mechanism to place the bag in the cassette from the receiving portion, and that the control portion operate the shutter mechanism to place the receivable bag in the cassette.

Further, in this invention it is preferable that the bag insertion portion is constructed such that enables to pull out and the receiving portion receives the bag in the vertical direction, and that the control portion, after pulling out of the bag insertion portion, detect the fact of being returned, and receive the read information from the reader.

Further, in this invention it is preferable that the safe for deposits further have an input portion for input of identification data of a person who inserted the bag and a lock mechanism to lock the bag insertion portion, and that the control portion judge the validity of the input identification data and release the lock of the lock mechanism.

Further, in this invention it is preferable that the cassette have a door covering an aperture to receive the bag from the receiving portion, and that the cassette housing portion have a cassette lock mechanism to open the door of the inserted cassette.

Further, in this invention it is preferable that the cassette lock mechanism close the door at the time of removal of the cassette from the cassette housing portion.

In a safe for deposits of this invention, recovery entails only cassette attachment and removal operations, and the danger of failure to recover a cash bag (a cash bag being left behind) is eliminated. Also, because information (number of units and similar) of the cash bags placed in a cassette is stored, checks of cash bags can be performed. Further, because a cassette cannot be opened, theft during transport can be prevented.

Also, at the time of insertion into the safe, only receivable bags are selected and received, so that mistaken insertion does not occur, and the trouble entailed by subsequent corrective action can be eliminated. Consequently it is possible to reliably outsource bookkeeping operations.

DESCRIPTION OF THE PREFERRED EMBODIMENTS

Below, embodiments of this invention are explained in the order of a system for deposit processing, a safe for deposits, a method of control of a safe for deposits, and other embodiments.

Deposit Processing System

Figure 1:
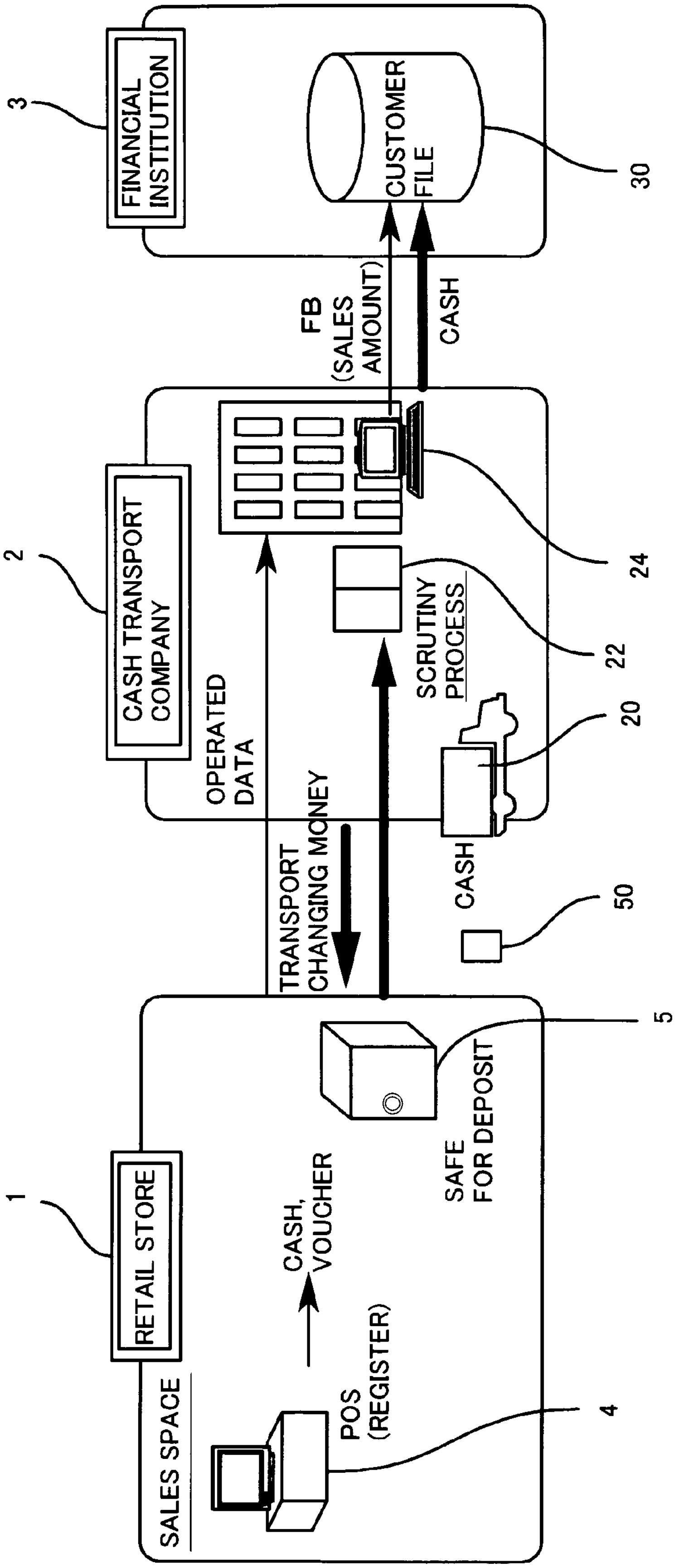
FIG. 1 shows the configuration of a deposit processing system of one embodiment of this invention.

FIG. 1 shows the configuration of a deposit processing system of one embodiment of this invention. As shown in FIG. 1, one or a plurality of POS (Point of Sale) terminals 1 with cash drawers are provided in the sale space of the retail store (store) 1, and a safe for deposits 5 is provided in a back yard. As is well known, the POS terminal 1 performs registration of merchandise for sale, calculations of total amounts, receipt issuing, and control of the cash drawer (tray which accepts cash).

Figure 2:
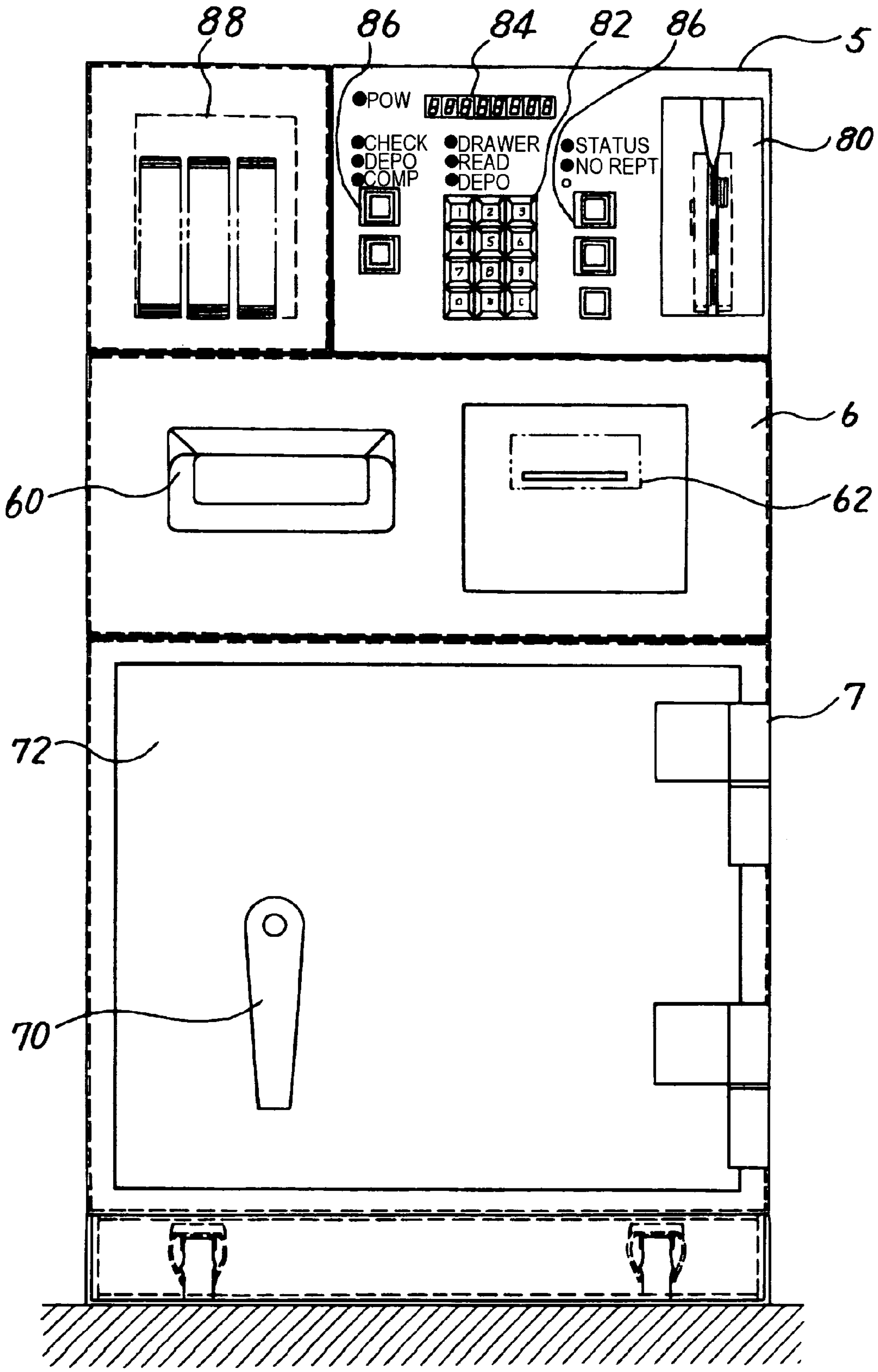
FIG. 2 is a front view of the safe for deposits of FIG. 1.

As described in FIG. 2 and subsequent figures, the safe for deposits 5 has a drawer-type insertion portion into which a bag in which cash has been placed is inserted, a reader portion which reads the information of inserted bags, a replaceable cassette 50, and a storing portion provided on the cassette 50. The operator sets the bag in the drawer-type insertion portion and presses on the drawer portion to perform insertion; the information of an inserted bag is read by the reader portion. The control portion receives the bag only when the data stored in advance in the storing portion of the device matches the data read. A received bag is housed in the lower cassette 50, and the fact that the bag has been housed is written on the storing portion of the cassette 50 by the control portion.

When the cassette 50 is set within the safe, the housing door is open and a bag can be housed within; but when the cassette 50 is to be removed, if the housing door is not closed the cassette 50 cannot be removed. This cassette 50 is constructed such that after removal, opening is only possible by specified persons, using a key or similar means.

In the store 1, an employee of the cash transport company 2 entrusted with transport of this cash cassette removes the cassette 50 from the safe 5, sets a replacement cassette in place, and uses a transport vehicle 20 for transport to the cash transport company 2. At the cash transport company 2, scrutiny processing equipment 22, including a computer 24, is provided.

This scrutiny processing equipment 22 reads the contents of the storing portion of a transported cassette 50, also reads the contents of the storing portion of cash bags within the cassette 50, and compares both contents. By this means, even when tasks are outsourced, checks for the loss of cash bags can be made.

The scrutiny processing equipment 22 uses a cash counting device to count the cash within cash bags, and uses the computer 24 to compare the cash data of operation data (operation data of POS terminals 4) received from computer systems comprised by POS terminals 4 at the store 1 with the counting results to execute cash scrutiny processing.

An employee of the cash transport company 2 brings the scrutinized cash to the financial institution 3, and makes a deposit of the cash in an account for the store. If necessary, sales amount data is transmitted from a computer of the cash transport company 2 to the financial institution 3. At the financial institution 3, the deposit data is stored in the customer file 114 of a computer system. Moreover, any coins or other changed money necessary for retail sales are transported by the cash transport company to the retail store 100.

In this way, by using a deposit safe 4 within the store 1, recovery entails only the attachment and removal of cassettes 50, and the danger of un-recovered cash bags (cash bags being left behind) is eliminated. Also, because information (the number of bags and similar) for the cash bags held in a cassette 50 is stored, it is possible to perform a check of cash bags. Further, because the cassette 50 cannot be opened, theft during transport can be prevented.

Moreover, at the time of insertion into the safe 4, only receivable bags are selected and received, so that erroneous insertion does not occur, and the trouble of subsequent corrective action can be eliminated. As a result, secure outsourcing of bookkeeping operations is possible.

Safe for Deposits

Figure 3:
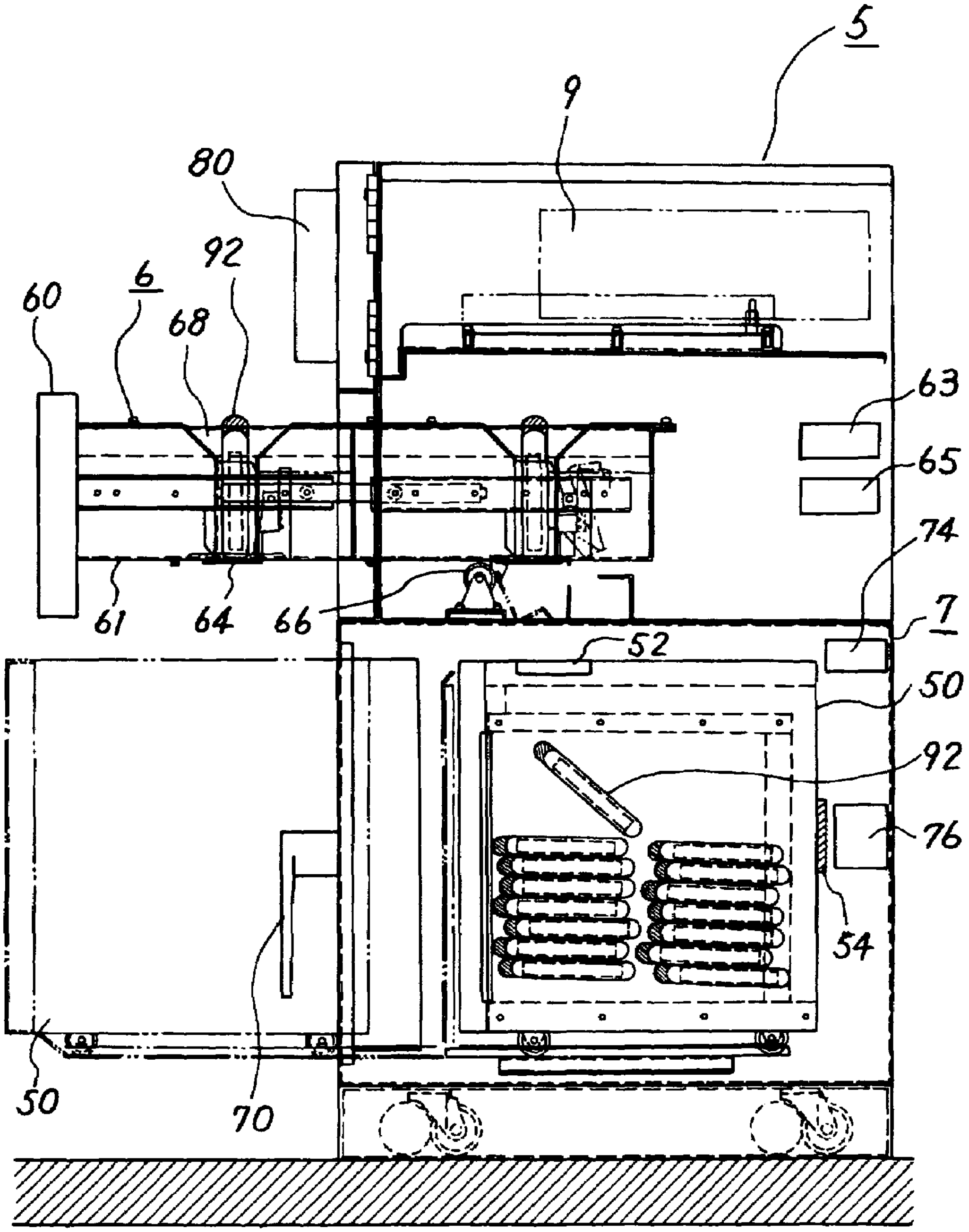
FIG. 3 is a cross-sectional view of the safe for deposits of FIG. 2.
Figure 4:
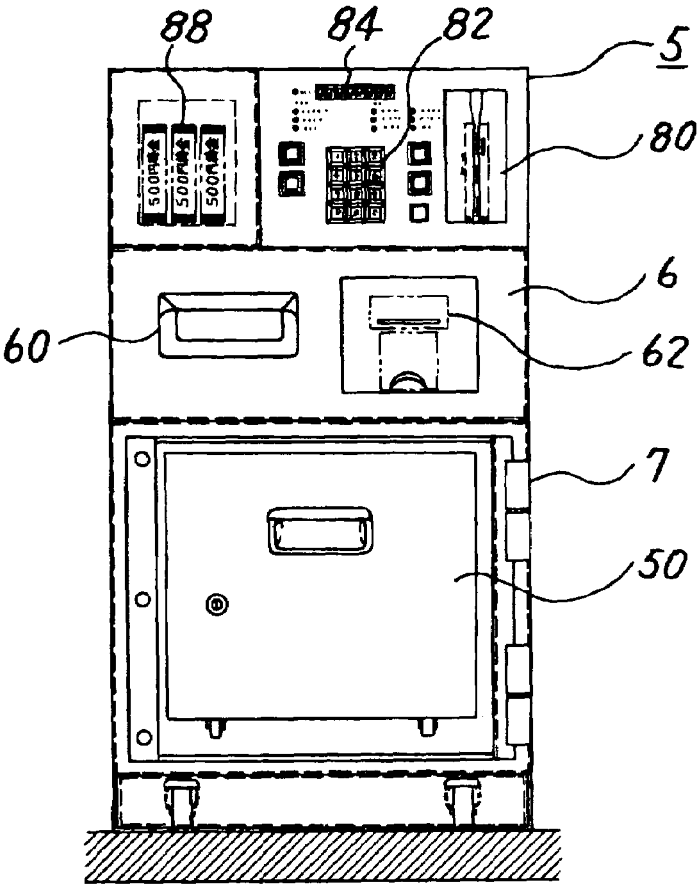
FIG. 4 is a front view of the safe for deposits of FIG. 2 when the safe door is open.
Figure 5:
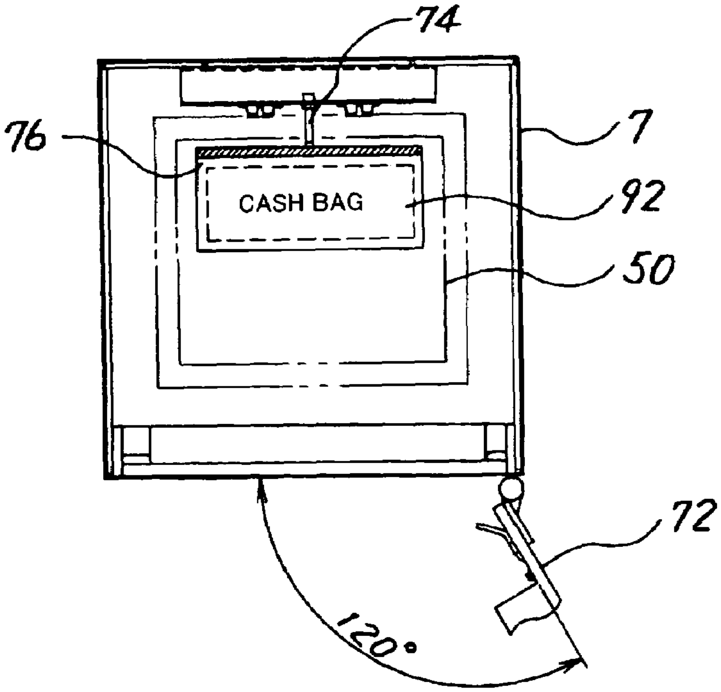
FIG. 5 is a top view of the safe for deposits of FIG. 4.

Next, details of the configuration of a safe for deposits 5 in a store 1 as shown in FIG. 1 are explained. FIG. 2 is a front view of the safe for deposits 5 of FIG. 1; FIG. 3 is a cross-sectional view of the safe for deposits of FIG. 2; FIG. 4 is a front view of the safe for deposits of FIG. 2 with the safe door open; and FIG. 5 is a top view of the cassette housing portion of the safe for deposits of FIG. 3.

As shown in FIG. 2, the safe for deposits 5 has an operation portion in the top section, a drawer-type insertion portion 6 in the middle section, and a cassette housing portion 7 in the bottom section. In the operation portion are provided a card reader 80, numeric keypad 82, display portion and indicator group 84, and function key group 86. The card reader 80 reads an ID card imparted to cassette replacement personnel of the cash transport company.

The numeric keypad 82 is provided for input of the store ID at the time of insertion (upon delivery) of cash bags by an employee of the store 1, and for input of a password number and similar by cassette replacement personnel. The display portion and indicator group 84 comprise a display portion which displays information input using the numeric keypad, and an indicator group which provides lamp display of the state of operation of the equipment (bag checks, bag housing, transaction completion) and the locations of problems in the equipment (drawer state, bag reading, bag housing, safe storage state, receipt shortage, and similar).

The function key group 86 comprises a recovery initiation instruction key, delivery initiation instruction key, re-deliver instruction key, confirmation key, and similar. The operation portion is further provided with a cabinet 88, locked with a key, which holds loose change for use by the store.

The drawer-type insertion portion 6 is provided with a drawer handle 60, and a receipt printer 62 which prints and issues receipts. The cassette housing portion 7 is provided with a safe door 72 and a safe door handle 70.

As shown in the cross-sectional view of FIG. 3, a printed circuit board 9 (hereafter called the "control portion"), on which is mounted a control circuit, is provided in the operation portion. The drawer-type insertion portion 6 has, in the drawer tray 61 having the drawer handle 60, a bag insertion portion 68 which accepts bags 92 in the vertical direction; a shutter 64 provided on the bottom face of the bag insertion portion 68; a guide roller 66 which guides the bottom face of the drawer tray 61; a lock mechanism 63 on the drawer tray 61; and a lock release mechanism 65 on the shutter 64.

A storing portion in which bag information is stored is provided on a side face of each of the cash bags 92. An IC (integrated circuit) tag which can be read and written in a contact-free manner is appropriate as this storing portion. On a side face of the bag insertion portion 68 is provided a read/write mechanism (comprising an antenna) 67 which reads and writes, in a contact-free manner, the storing portions of the bags 92.

The cassette housing portion 7 has a cassette 50 for housing of bags, and a cassette lock mechanism 74 to lock the cassette 50 and to open the door 52, on the top face of the cassette 50. A storing portion 54, in which is stored information for the housed bags, is provided on a side face of the cassette 50. An IC (integrated circuit) which can be read and written in a contact-free manner is appropriate as this storing portion 54. In the cassette housing portion 7 is provided a reading/writing mechanism (comprising an antenna) 76 which reads and writes, in a contact-free manner, the storing portion 54 of the cassette 50.

As shown in FIG. 4 and FIG. 5, when the safe door 72 is opened and the cassette 50 is inserted into the housing portion 7, the cassette lock mechanism 74 causes the door lock of the cassette 50 to be released, and the top-face door 52 of the cassette 50 is opened. By this means, the cassette 50 can receive cash bags 92 from the drawer tray 61.

Figure 6:
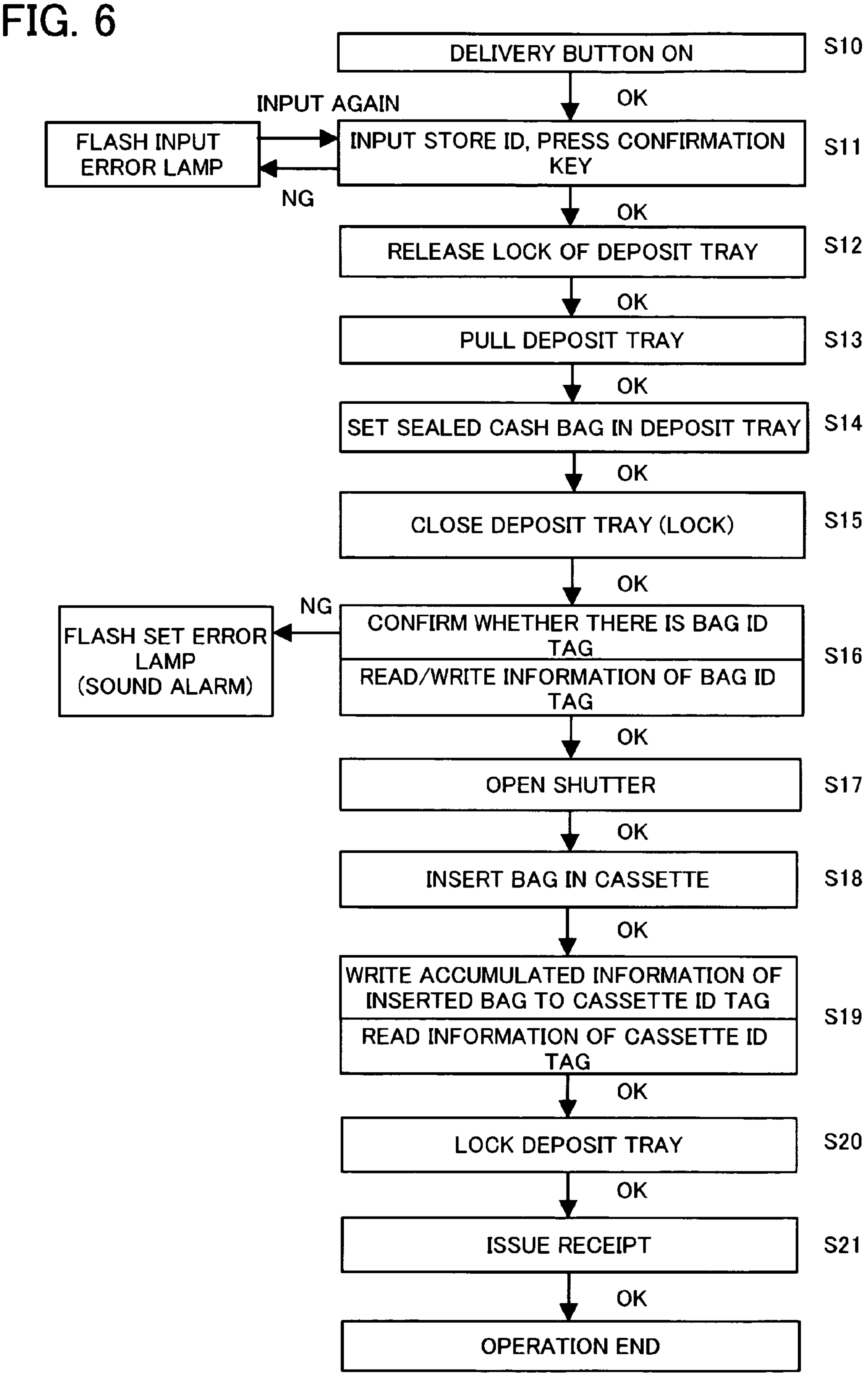
FIG. 6 shows the flow of bag housing operations of one embodiment of this invention.

Next, operation of this safe for deposits is explained, using FIG. 6 through FIG. 9. FIG. 6 shows the flow of operations for bag insertion (delivery), and FIG. 7 explains these operations.

(S10) An operator (employee) of the store 1 presses the delivery button of the function key group 86 to initiate a delivery operation.

(S11) Next, the operator inputs the store ID number using the numeric keypad 82, and presses the confirmation key of the function key group 86. The validity of this store ID number is checked by the control portion 9. The input store. ID number is displayed by the display portion, and if not valid, an input error lamp flashes. In this case, the store ID number can be input again.

(S12) If the store ID number is valid, the tray lock mechanism 63 causes the lock of the deposit tray 61 to be released.

Figure 7:
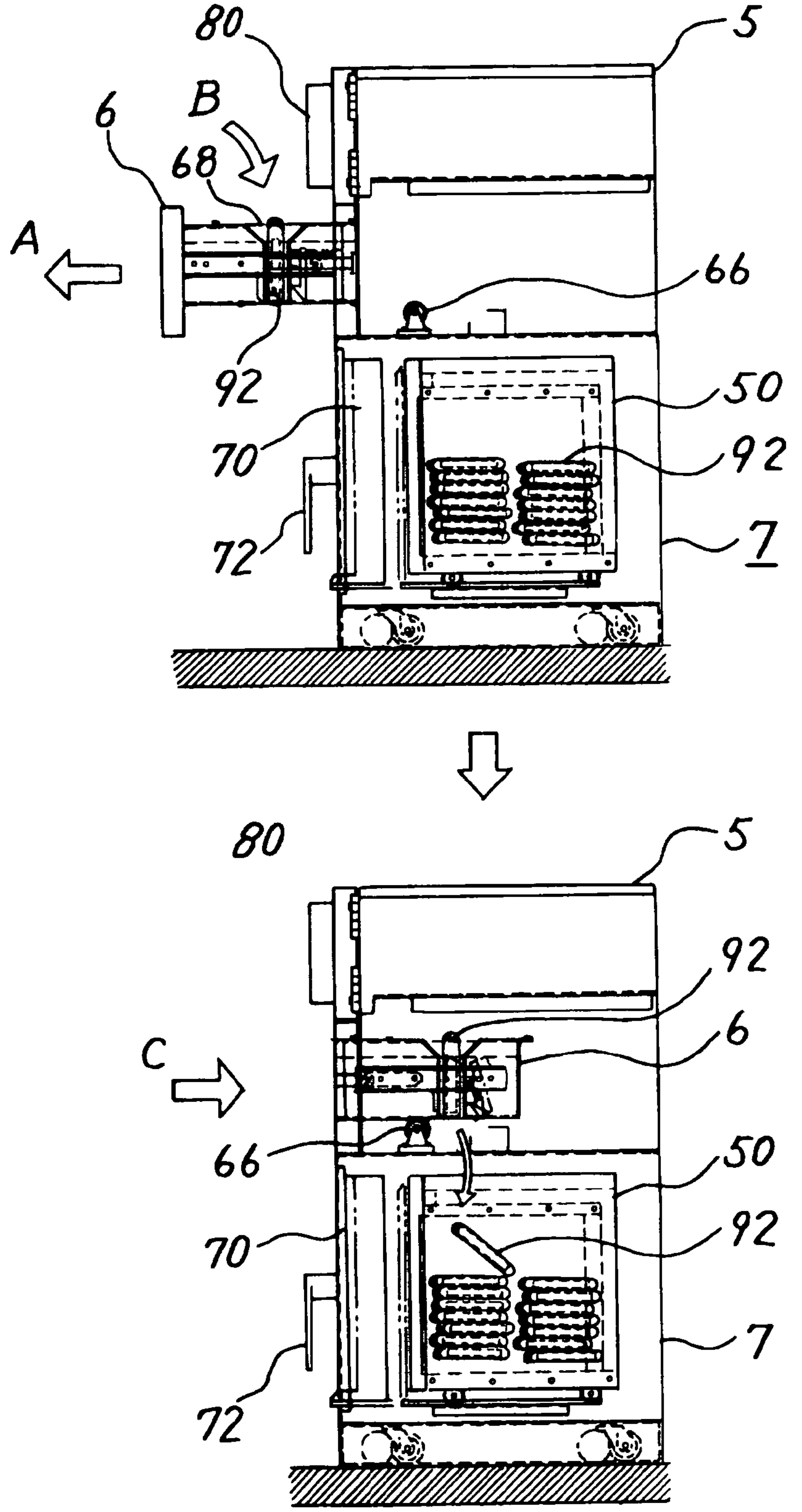
FIG. 7 explains the bag housing operations of FIG. 6.

(S13) Next, the operator pulls the deposit tray 61 in the direction of the arrow A, as shown in FIG. 7.

(S14) As shown in FIG. 7, the operator then sets the sealed cash bags (tagged bags) 92 containing cash in the insertion portion 68 of the drawer tray 61. The insertion portion 68 receives the bags 92 in the vertical direction.

(S15) Next, the operator presses the drawer tray 61 inward, in the direction of the arrow C in FIG. 7.

(S16) The reader/writer 67 judges whether there is a storing portion (IC tag) on a bag 92 inserted into the insertion portion 68, and also reads the information of the storing portion, and based on the read data (bag ID), the control portion 9 judges whether the bag 92 matches data stored in advance in the storing portion of the equipment. If there is no storing portion on the bag or if the information does not match, an indicator set error lamp flashes and an alarm sounds. As a result, processing returns to step S13, and removal of the deposit tray 61 becomes possible. That is, only the prescribed bags are accepted. The store ID number and the insertion date and time are written in the storing portion of an accepted bag by the reader/writer 67.

(S17) Next, the shutter lock release mechanism 65 operates to open the shutter 64 in the bottom of the insertion portion 68 of the tray 61.

(S18) As a result, the cash bag 92 in the insertion portion 68 of the tray 61 falls into the cassette 50 below and is placed therein, as indicated by the arrow in FIG. 7.

(S19) The cassette reader/writer 76 writes, in the storing portion 54 of the cassette 50, the fact that the bag has been placed therein. For example, the number of cash bags accumulated within the cassette 50 and data on the cash bags 92 are written, and to confirm writing, the storing portion 54 is then read.

(S20) Next, the tray lock mechanism 63 locks the drawer tray 61.

(S21) Finally, the receipt printer 62 prints on a receipt the store ID number and the insertion date and time, and issues the receipt.

In this way, the operator performs deposits by setting bags 92 in the drawer-type insertion portion 68 and pushing the drawer portion 68 in, and information for the bags 92 inserted therein is read by the reader portion. Based on the data read, the control portion 9 accepts only bags matching data stored in advance in the storing portion of the equipment. Hence mischievous or mistaken insertion of objects can be prevented, and the trouble entailed by subsequent corrective action (separation of: valid and invalid bags, and similar) can be averted.

Further, accepted bags 92 are placed in the cassette 50 below, and the fact that the bags 92 have been placed therein is stored in the storing portion 54 of the cassette 50. Also, when the cassette 50 is set within the safe, the housing door is open, and bags can be placed therein, but when the cassette 50 is to be removed, if the housing door is not closed the cassette 50 cannot be removed. Consequently theft during transportation can be prevented.

Further because the insertion portion 68 receives bags 92 for housing in one direction (the vertical direction), reading and writing of the storing portions of bags 92 is easy; and, even if the cassette 50 is dropped, the bags 92 within the cassette 50 can be easily oriented, preventing disordering of bags and enabling effective utilization of the space for housing within the cassette 50.

Figure 8:
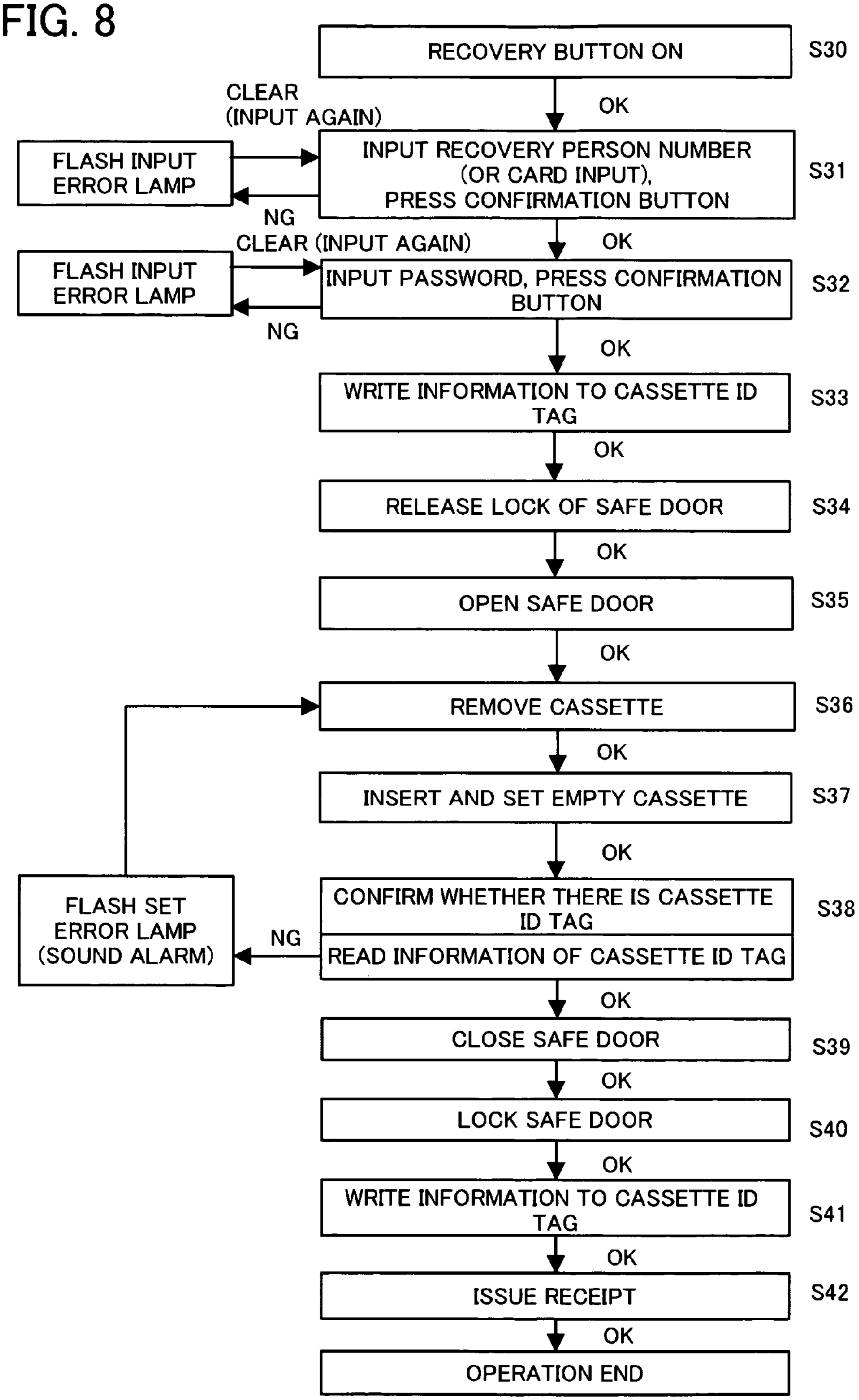
FIG. 8 shows the flow of cassette replacement operations of one embodiment of this invention.
Figure 9:
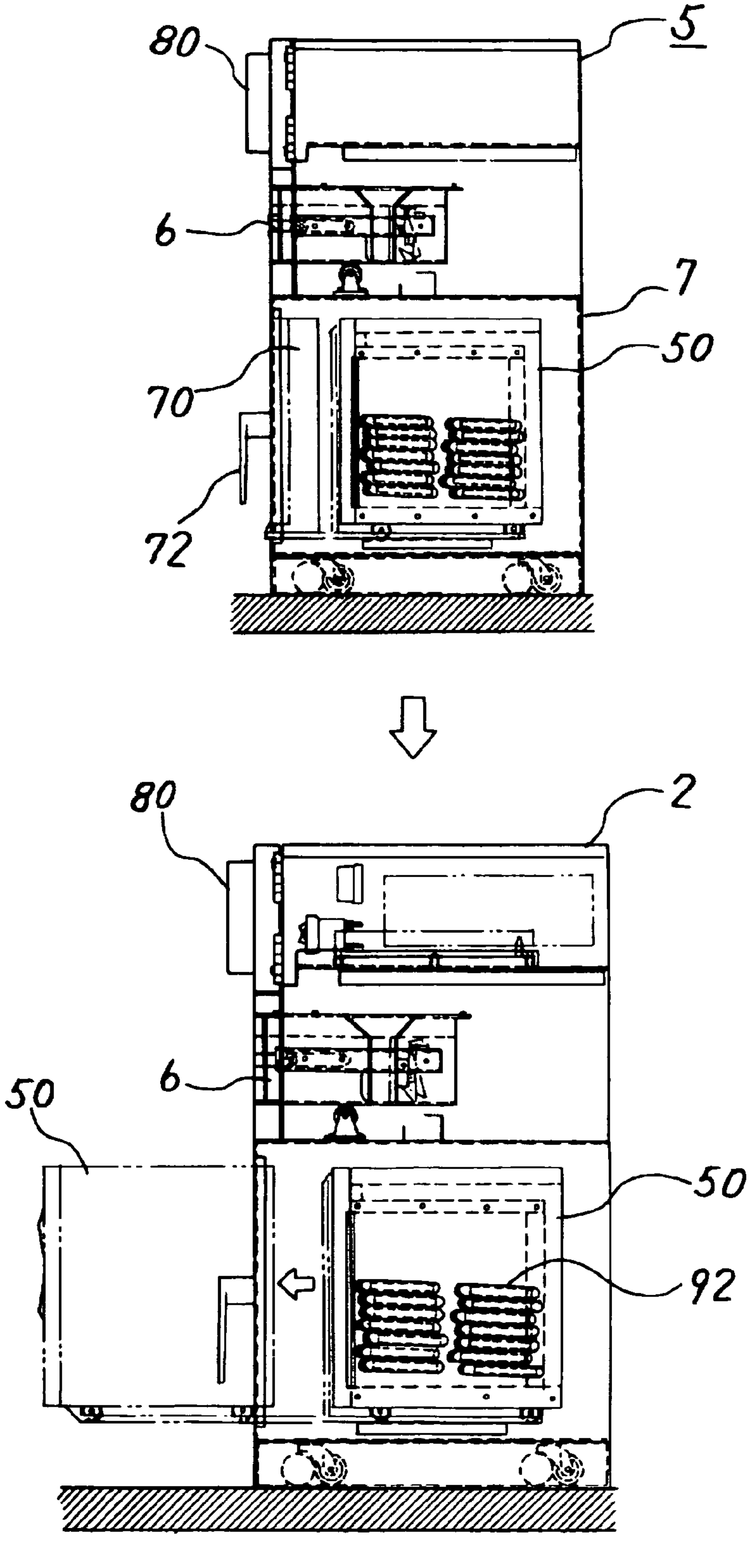
FIG. 9 explains the cassette replacement operations of FIG. 8.

FIG. 8 shows the flow of operations for cassette recovery (replacement), and FIG. 9 explains these operations.

(S30) The recovery person (for instance, a person performing recovery employed by the cash transport company or the store) presses the recovery button of the function key group 86 to initiate a recovery operation.

(S31) The recovery person then causes the card reader 80 to read an ID card, or uses the numeric keypad 82 to input the number of the recovery person, and presses the confirmation key of the function key group 86. This recovery person ID number is checked for validity by the control portion 9. The input recovery person ID number is displayed on the display portion, and if not valid, the input error lamp flashes. In this case, a recovery person ID number can be input once again.

(S32) If the recovery person ID number is valid, the recovery person inputs a password number and then presses the confirmation key. This password number is checked for validity by the control portion 9. The input password number is displayed on the display portion, and if invalid, the input error lamp flashes. In this case, a password number can be input once again.

(S33) The reader/writer 76 of the cassette housing portion 7 writes the recovery person ID and recovery date and time in the storing portion 54 of the cassette 50.

(S34) The lock of the safe door 72 of the cassette housing portion 7 is released by a lock mechanism, not shown.

(S35) Next, the recovery person opens the safe door 72, as shown in FIG. 5 and FIG. 9.

(S36) As shown in FIG. 9, the recovery person then pulls out and removes the cassette 50 within the housing portion 7. At this time, the top-face door 52 of the cassette 50 is closed by the cassette lock mechanism 74.

(S37) Next, the recovery person inserts and sets in place an empty cassette 50 into the housing portion 7.

(S38) The reader/writer 76 of the housing portion 7 reads the information of the storing portion 54 of the cassette 50 inserted into the housing portion 7, and based on the read data (cassette ID), the control portion 9 judges whether this cassette 50 matches data stored in advance in the storing portion of the equipment. If there is no match, the indicator set error lamp flashes and an alarm sounds. As a result, processing returns to step S35, and the cassette 50 can be withdrawn. In other words, only prescribed cassettes are accepted. The store ID number and recovery person ID are written in the storing portion 54 of an accepted cassette 50 by the reader/writer 76.

(S39) The recovery person then closes the safe door 72.

(S40) The safe door 72 is locked by a lock mechanism, not shown, of the cassette housing portion 7.

(S41) The cassette reader/writer 76 of the housing portion 7 writes the store ID number in the storing portion 54 of the cassette 50.

(S42) Finally, the receipt printer 62 prints the recovery person ID number, store ID number, and recovery date and time on a receipt, and issues the receipt.

In this way, recovery entails only replacement of the cassette 50, and the danger of failure to recover a cash bag (a cash bag being left behind) is eliminated. Information on the bags within is stored in the cassette 50, and after removal the cassette can only be opened by specified persons, using a key or similar means, so that theft during transport can be prevented. Moreover, because data is also stored in the storing portions of the bags, the cassette 50 can be delivered and bookkeeping tasks can be outsourced securely.

Method of Control of Safe for Deposits

Figure 10:
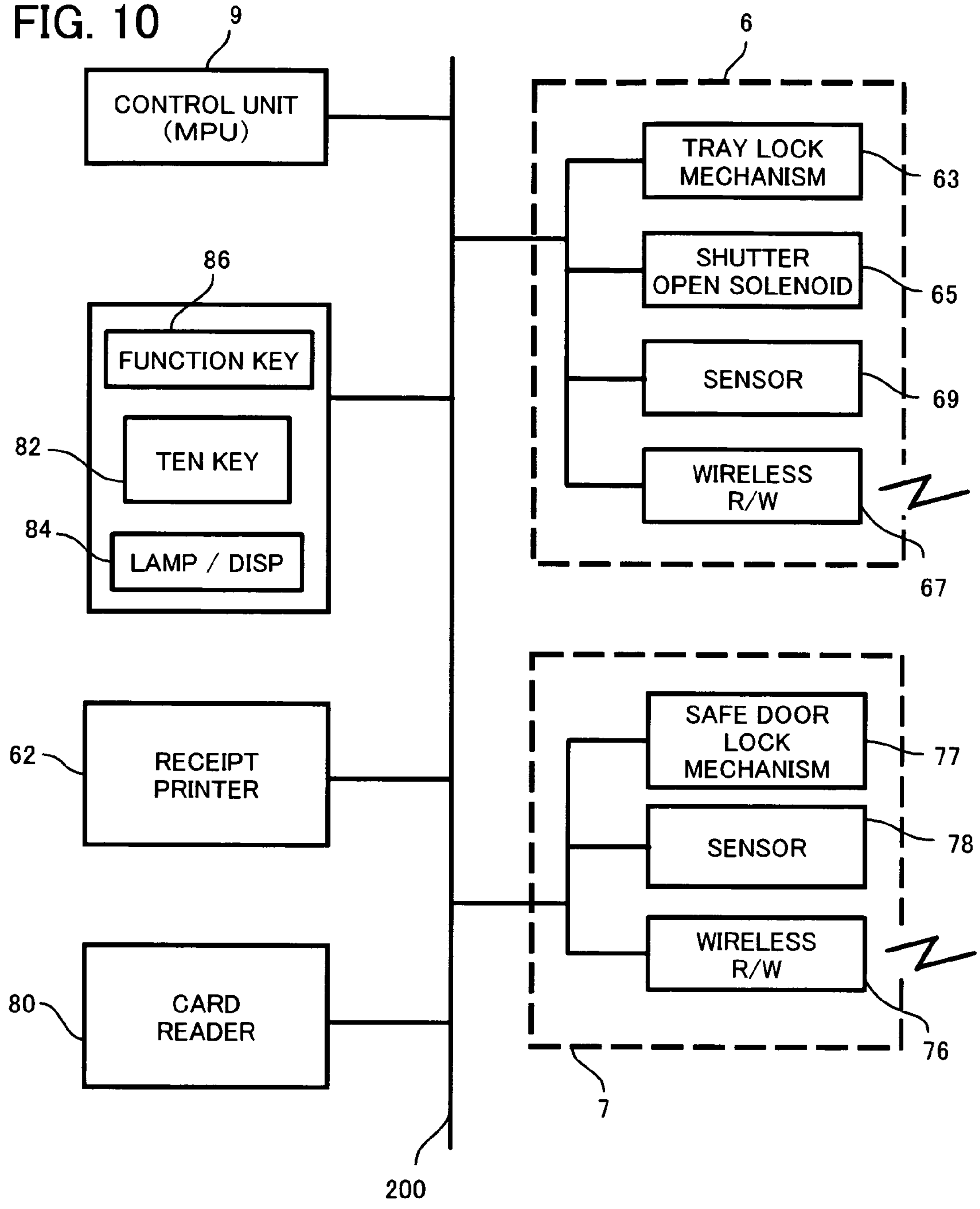
FIG. 10 is a block diagram of a safe for deposits of one embodiment of this invention.
Figure 15:
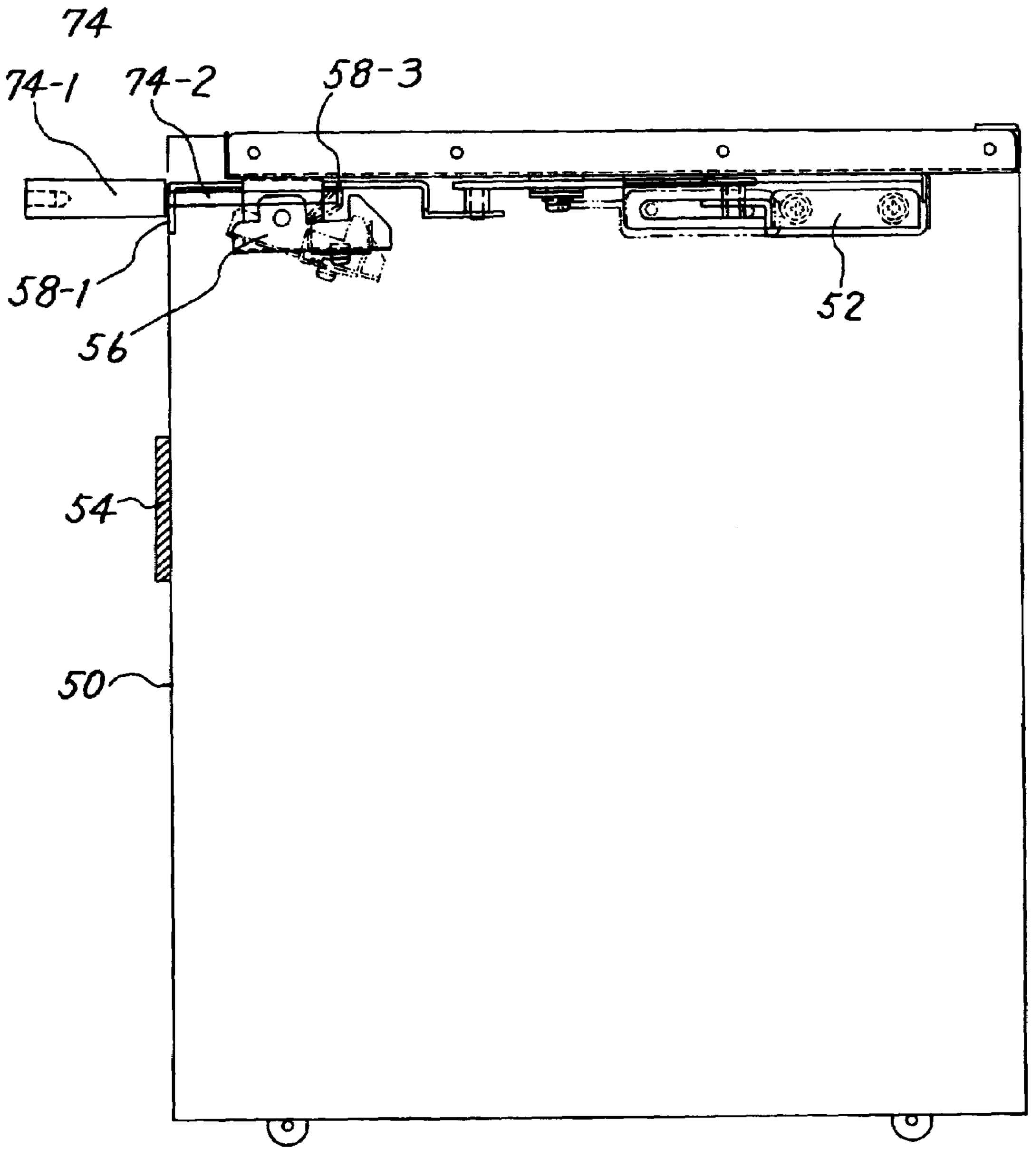
FIG. 15 is a cross-sectional view of the cassette of FIG. 11.
Figure 16:
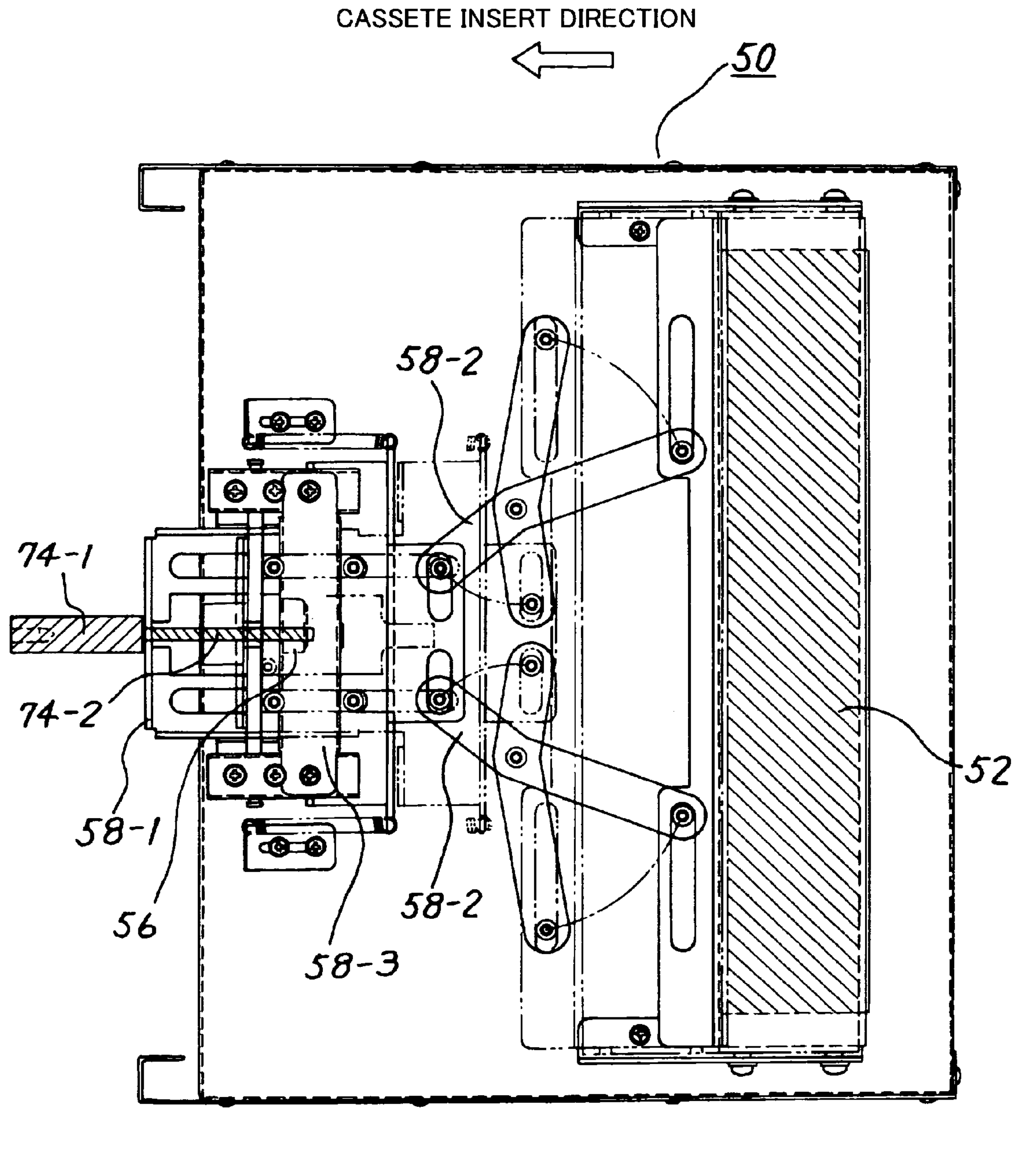
FIG. 16 is a top view of the cassette of FIG. 15.

Next, a control mechanism and method of control of a safe for deposits are explained. FIG. 10 is a block diagram of a safe for deposits of one embodiment of this invention; FIG. 11 through FIG. 14 show the detailed configuration of the drawer-type insertion portion; and FIG. 15 and FIG. 16 show the detailed configuration of the cassette and the cassette housing portion.

As shown in FIG. 10, the tray lock mechanism 63, shutter opening mechanism 65, sensor 69, and wireless tag reader/writer 67 of the above-described-drawer-type insertion portion 6, as well as the safe door lock mechanism 77, sensor 78, and wireless tag reader/writer 76 of the above-described cassette housing portion 7 are connected, by means of a data/address bus 200, to the control portion 9 comprising an MPU (microprocessor unit) and memory.

Similarly, the numeric keypad 82, display portion/indicator 84, and function keys 86 of the operation portion, as well as the receipt printer 62 and card reader 80, are also connected by the data/address bus 200 to the control portion 9 comprising an MPU (microprocessor unit) and memory.

Figure 11:
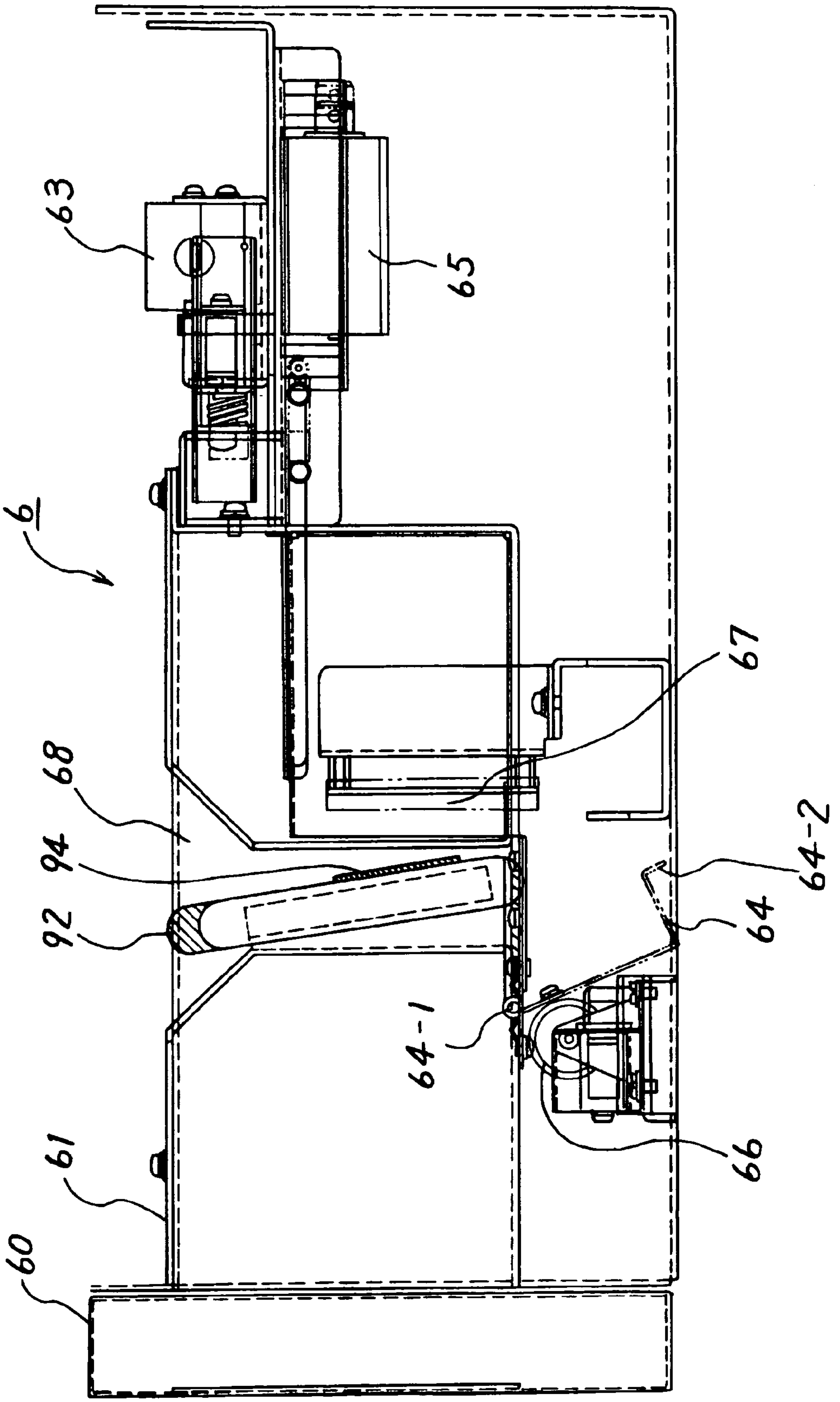
FIG. 11 is a cross-sectional view of the bag insertion portion of FIG. 3.
Figure 12:
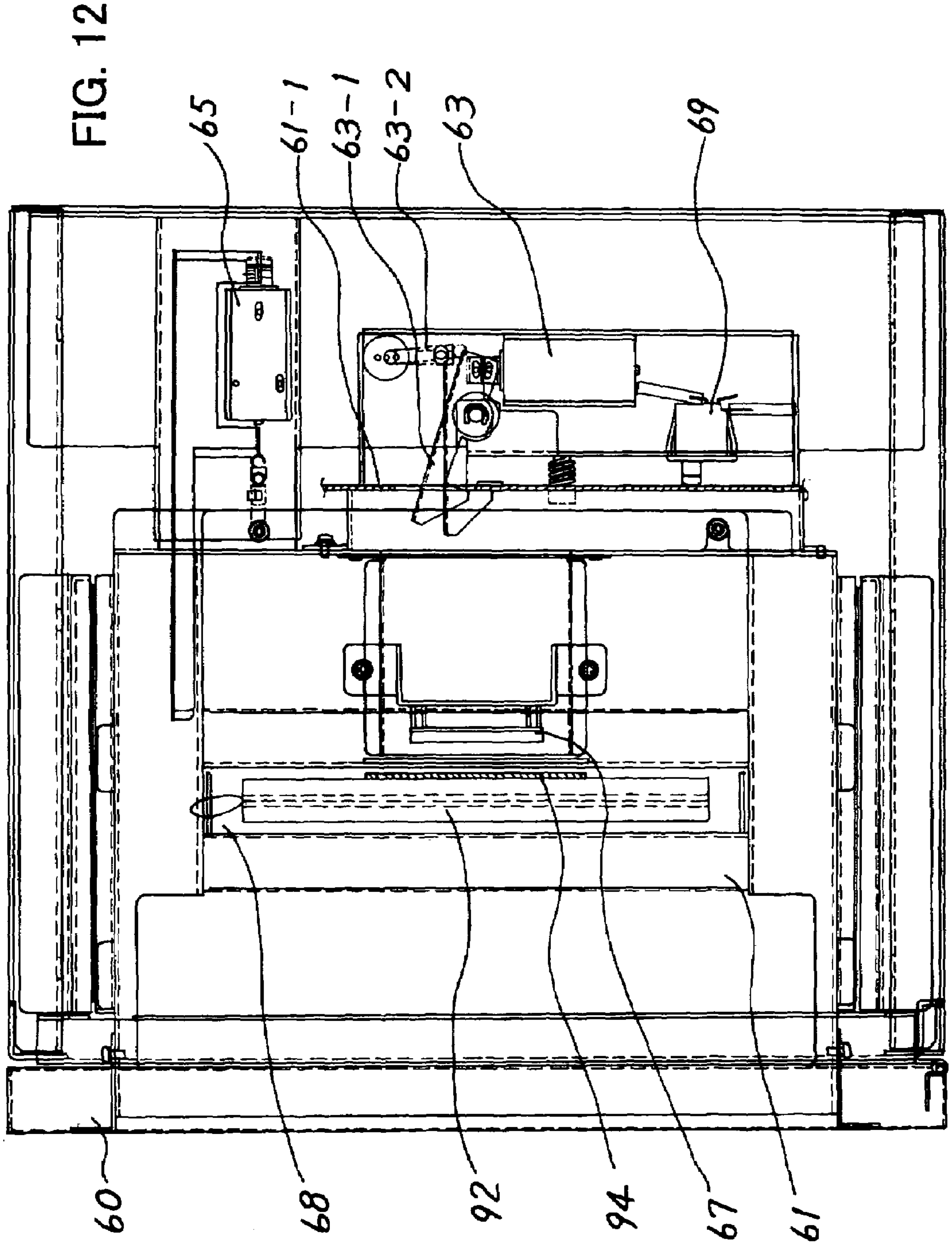
FIG. 12 is a top view of the bag insertion portion of FIG. 11.
Figure 13:
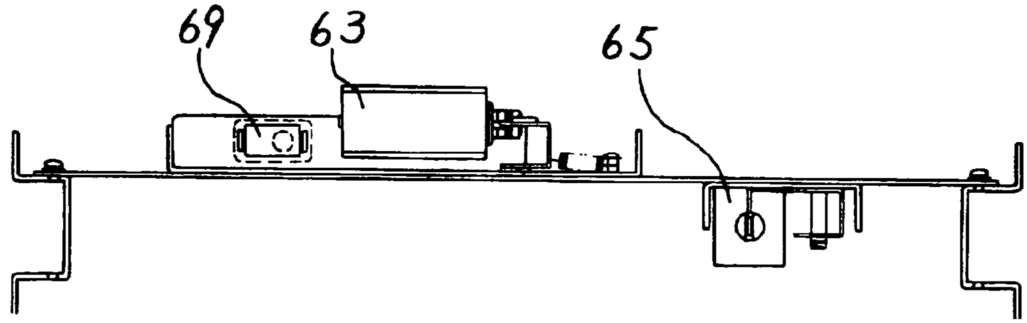
FIG. 13 is a cross-sectional view of the lock mechanism of the bag insertion portion of FIG. 11.
Figure 14:
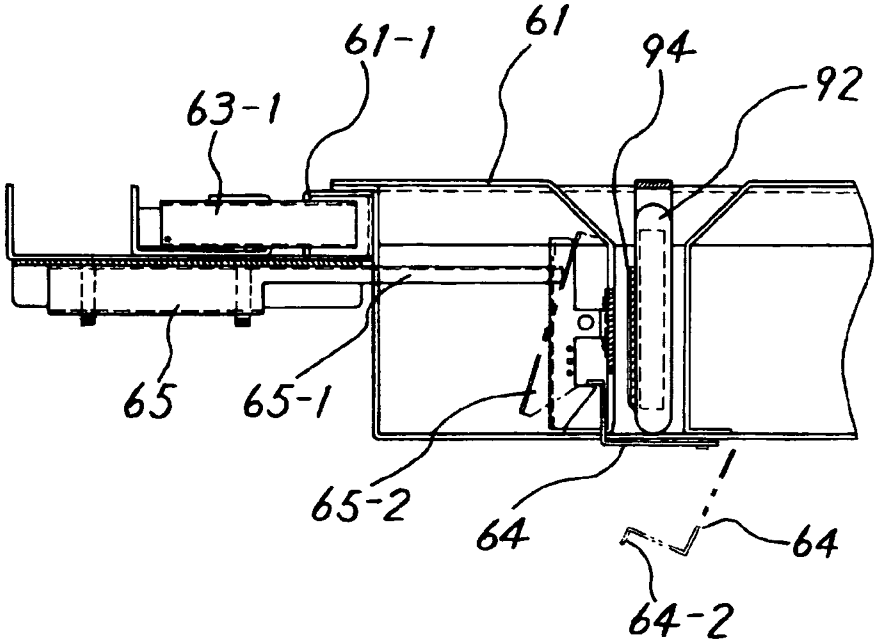
FIG. 14 shows the configuration of the shutter release mechanism of the bag insertion portion of FIG. 11.

The details of the drawer-type insertion portion 6 are explained, referring to FIG. 11 through FIG. 14. FIG. 11 is a cross-sectional view of the drawer-type insertion portion 6; FIG. 12 is a top view of the drawer-type insertion portion 6; FIG. 13 shows the configuration of the mechanisms 63, 65 of FIG. 11 and FIG. 12, seen from the upper side of FIG. 12; and FIG. 14 shows the configuration of the shutter opening mechanism 65 of FIG. 11.

As shown in FIG. 11 and FIG. 12, the drawer tray 61 having a drawer handle 60 further has a bag insertion portion 68, which vertically houses cash (storage) bags 92, and a shutter 64 provided in the bottom face of the bag insertion portion 68. A guide roller 66 which guides the bottom face of the tray 61 and which closes the shutter 64 when pulled out is provided on the bottom face side of the drawer tray 61 of the drawer-type housing portion 6. On the posterior side of the drawer tray 61 (the right side of FIGS. 11 and 12) are provided a lock mechanism 63 for the drawer tray 61 and a lock release mechanism 65 for the shutter 64.

Further, a storing portion 94 which stores bag information is provided on a side face of the cash bags 92 housed in the bag housing portion 68. An IC (integrated circuit) tag 94 which can be read and written in a contact-free manner is appropriate as this storing portion. On a side face of the bag insertion portion 68 is provided a read/write mechanism (comprising an antenna) 67 which reads and writes, in a contact-free manner, the storing portion 94 of the bag 92.

FIG. 12 through FIG. 14 explain the lock mechanism 63 of the drawer-tray 61 and the shutter release mechanism 65. As shown in FIG. 12 and FIG. 13, the lock mechanism 63 of the drawer tray 61 comprises a solenoid 63 having a hook 63-1. As shown in FIG. 12, a latching aperture 61-1 into which the hook 63-1 is inserted is provided on the posterior face (on the side opposite the handle 60) of the drawer tray 61.

As shown in FIG. 12 and FIG. 14, when the drawer tray 61 is pushed in, the hook 63-1 of the lock mechanism 63 is inserted into the latching aperture 61-1 of the drawer tray 61. Because the tip of the hook 63-1 has an inclined face, the hook 63-1 enters the latching aperture 61-1 of the drawer tray 61, and the hook 63-1 is locked in the latching aperture 61-1 of the drawer tray 61.

When on the other hand the solenoid 63 is driven and the hook 63-1 is rotated about the shaft, the lock of the hook 63-1 in the latching aperture 61-1 is released. A sensor 69 which detects the set position of the drawer tray 61 is provided in the vicinity of the solenoid 63.

Further, as shown in FIG. 12 and FIG. 14, the shutter release mechanism 65 comprises a solenoid 65 comprising an actuating rod 65-1, and a rotating hook 65-2 driven by the solenoid 65. On the other hand, the shutter 64 is rotatably mounted on the frame of the drawer tray 61 centered on the shaft 64-1, as shown in FIG. 11. The tip of this shutter 64 has an engaging portion 64-2 which engages with the hook 65-2.

Hence as shown by the solid line in FIG. 14, with the shutter 64 in the closed state, the engaging portion 64-2 of the shutter 64 is locked by the hook 65-2, the shutter 64 is closed, and cash bags 92 can be held.

When on the other hand the solenoid 65 is driven to drive the actuating rod 65-1 in the rightward direction in FIG. 14, the hook 65-2 rotates in the clockwise-direction, and locking of the engaging portion 64-2 by the hook 65-2 is released; as shown by the dashed line in FIG. 14, the shutter 64 rotates in the counterclockwise direction about the shaft 64-1 to open the shutter 64.

With the shutter of FIG. 11 in the open state, on pulling out the drawer tray 61 (moving leftward in FIG. 11), the shutter 64 rotates in the counterclockwise direction in FIG. 11 by means of the guide roller 66, and as indicated by the solid line in FIG. 14, the engaging portion 64-2 of the shutter-64 engages with the hook 65-2 so that the engaging portion 64-2 of the shutter 64 is locked by the hook 65-2 the shutter 64 is closed, and cash bags 92 can be held.

Next, the lock mechanism 74 of the cassette 50 and cassette housing portion 7 is explained, referring to FIG. 15 and FIG. 16. FIG. 15 is a cross-sectional view of the cassette 50 and cassette lock mechanism 74; FIG. 16 is a top view of same.

As shown in FIG. 15 and FIG. 16, the cassette 50 for placing the bag therein is formed in a box shape, on the top face of which are provided a top-face door 52, a door open/close driving mechanism 58-1 to 58-3, and a hook 56 to lock the operation of the driving mechanism 58-1 to 58-3.

On the other hand, a cassette lock mechanism 74 is provided on the posterior face (the face opposite the insertion-face) of the cassette housing portion 7 as shown in FIG. 3. On a side face of this cassette 50, a storing portion 54, to store information on placed bags, is provided. As this storing portion 54, an IC (integrated circuit) tag which can be read and written in a contact-free manner is appropriate. Also, a reading/writing mechanism (comprising an antenna) 76 for reading and writing of the storing portion 54 of the cassette 50 in a contact-free manner is provided on the posterior face of the cassette housing portion 7.

The door opening/closing driving members 58-1 to 58-3 are a slide member 58-1, which performs sliding movement with respect to the frame of the cassette 50; a hook engaging portion 58-3 provided in the slide member 58-1; and a pair of rotating arms 58-2 which is driven by the slide member 58-1. The tips of the rotating arms 58-2 engage with the top-face door 52.

On the other hand, the cassette lock mechanism 74 comprises an actuating rod, having a thick portion 74-1 and a thin portion 74-2. As shown in FIG. 16, when the cassette 50 is inserted the thin portion 74-2 is inserted into a hole in the slide member 58-1 on the posterior face of the cassette

50, and the tip thereof rotates the hook 56 which is rotatably mounted on the frame of the cassette 50 (dashed line in FIG. 15).

By this means, the lock of the slide member 58-1 is released, and the slide member 58-1 comes into contact with the thick portion 74-1, so that the thick portion 74-1 is pressed and slides rightward in FIG. 16. By this means, the pair of rotating arms 58-2 provided at the tip of the slide member 58-1 rotate, and the top-face door 52 opens. In other words, the cassette 50 normally is such that the top-face door 52 is closed, but by insertion of the cassette 50 into the housing portion 7, the top-face door 52 is opened by mechanical means. As a result, cash bags 92 can be received.

When on the other hand the cassette 50 is pulled-out from the housing portion 7, the slide member 58-1 returns in the leftward direction in FIG. 16, the pair of rotating arms 58-2 provided on the tip of the slide member 58-1 are rotated in the opposite direction, and the top-face door 52 is closed. Further, the thin portion 74-2 is retracted from the cassette 50, and the pressing force of the hook 56 at the tip thereof is removed. Consequently the hook 56 returns along the solid line in FIG. 15 and engages the engaging portion 58-3 of the slide member 58-1, to lock the slide member 58-1.

Hence even if the cassette 50 is removed, it is difficult to open the top-face door 52, thus helping to prevent the loss or theft of bags. And because a special mechanical mechanism is employed, even if the cassette 50 is removed, illicit opening of the top-face door 52 can be prevented.

Figure 17:
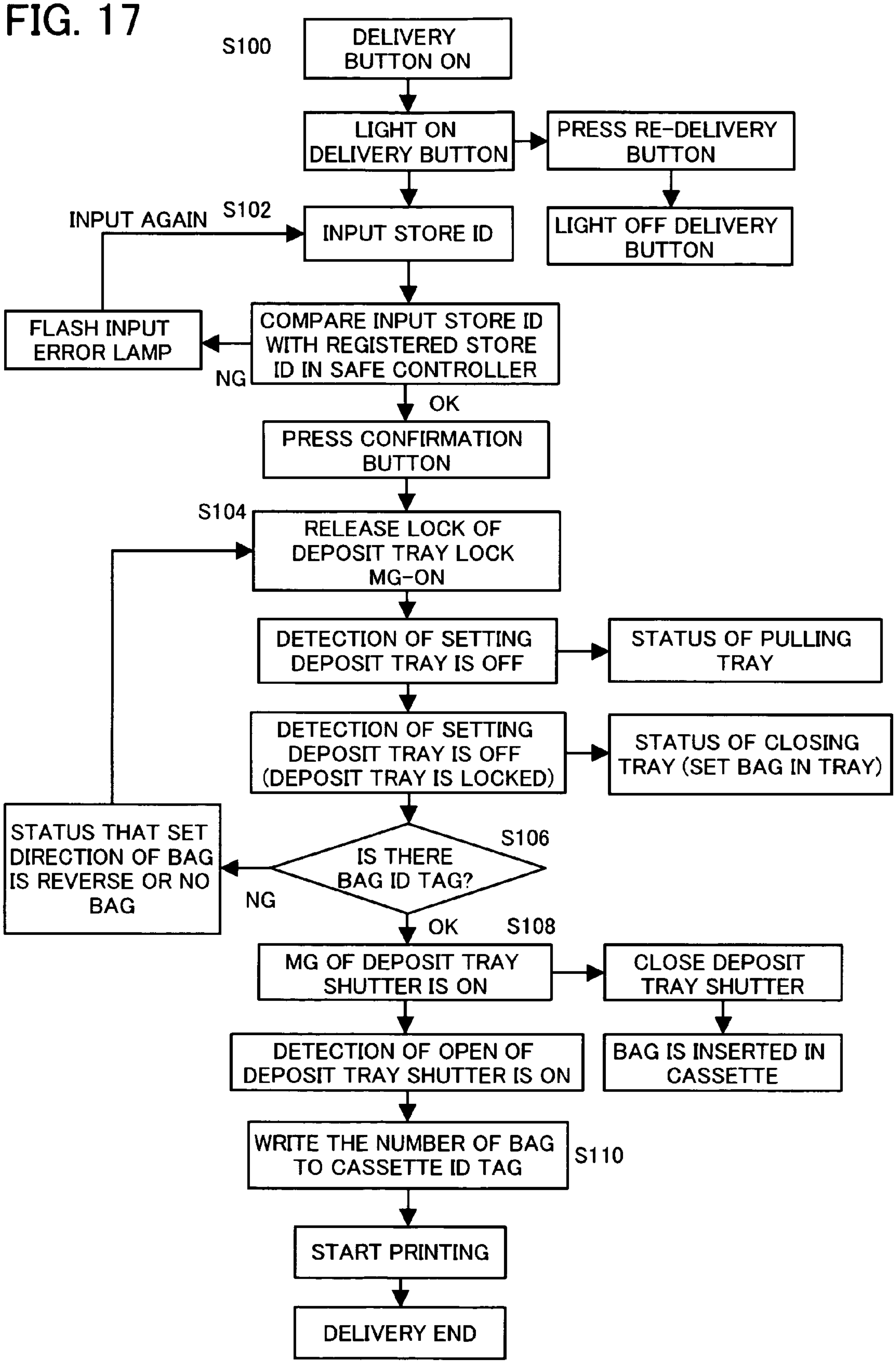
FIG. 17 shows the flow of bag housing processing of one embodiment of this invention.
Figure 18:
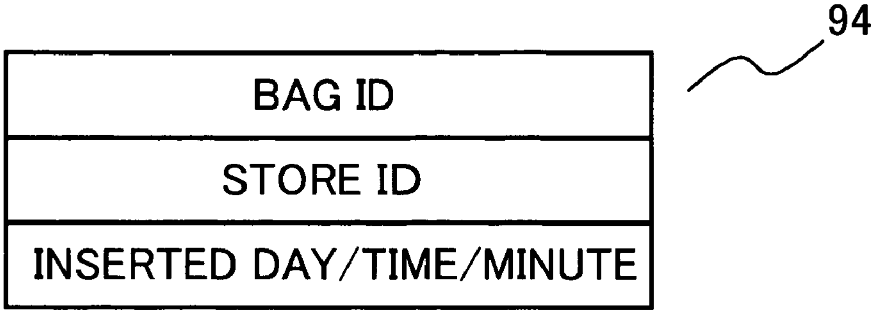
FIG. 18 shows the data configuration of the bag storing portion of FIG. 17.
Figure 19:
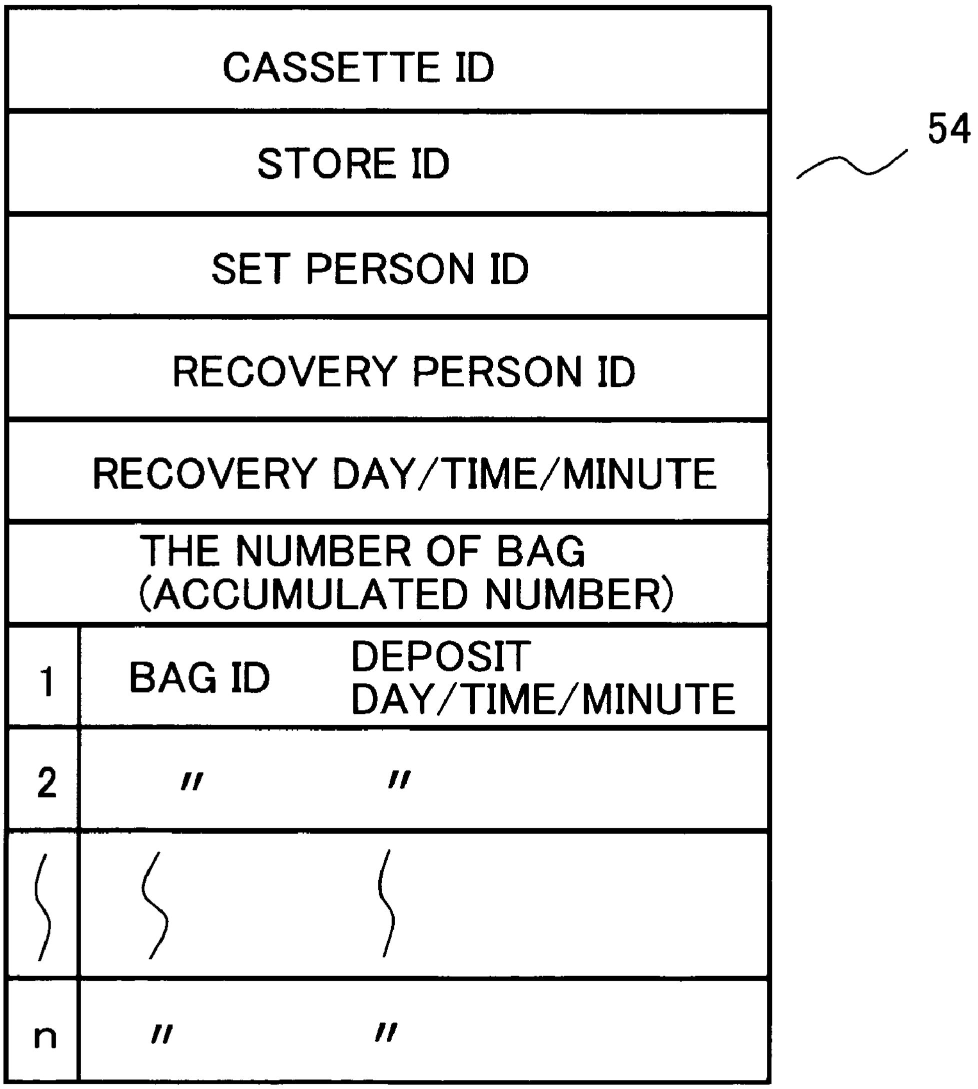
FIG. 19 shows the data configuration of the cassette storing portion of FIG. 17.

Next, control of the safe for deposits 5 is explained, referring to FIG. 17 through FIG. 20. FIG. 17 shows the flow of processing of bag insertion (delivery); FIG. 18 shows the data configuration of the IC tags of cash bags; and FIG. 19 shows the data configuration of the IC tags of cassettes.

(S100) The control portion (hereafter called the MPU) 9 detects the pressing of the delivery button in the function key group 86 by an operator (employee) of the store 1, and lights the delivery button. When pressing of the delivery button is again detected, the delivery button is extinguished and processing ends.

(S102) Next, the MPU 9 detects input of the store ID number using the numeric keypad 82, compares this with registered store ID numbers, and checks for validity. The input store ID number is displayed on the display portion, and if invalid, an input error lamp flashes. In this case, a store ID number can again be input. If the number is valid, the MPU 9 detects pressing of the confirmation button.

(S104) If the store ID number is valid, when the confirmation button is pressed, the MPU 9 drives the solenoid of the tray lock mechanism 63 to release the locking of the deposit tray 61 by the hook 63-1. The MPU 9 then detects, through the output of the sensor 69, that the operator has pulled out the deposit tray 61 in the direction of the arrow A as shown in FIG. 7. The MPU 9 also detects, through the output of the sensor 69, that the operator has set a sealed cash bag (tagged bag) 92 containing cash in the insertion portion 68 of the drawer tray 61 and has pushed the drawer tray 61 in, in the direction of the arrow C as shown in FIG. 7.

(S106) Based on the output of the reader/writer 67, the MPU 9 judges whether there is a storing portion (IC tag) 94 on a bag inserted into the insertion portion 68. If there is no storing portion 94, it is judged that either the bag has been set in the opposite direction or that a prescribed bag has not yet been set and the indicator set error lamp flashes and an alarm sounds. As a result, processing returns to step S104 and the deposit tray 61 can be pulled out. That is, only prescribed bags are accepted. The store ID number and insertion date and time are written in the storing portion 94 of a bag 92 which has been accepted, as shown in FIG. 18. In this case, it is also possible to read the bag ID using the reader/writer 67 and to judge whether the bag can be accepted.

(S108) Next, the MPU 9 operates the shutter lock release mechanism (solenoid) 65 and, as explained in FIG. 11 through FIG. 14, opens the shutter 64 below the insertion portion 68 of the tray 61. As a result, the cash bag 92 within the insertion portion 68 of the tray 61 falls into and is housed in the cassette 50 beneath, as indicated by the arrow in FIG. 7. The MPU 9 detects, from the output of a sensor not shown provided in the drawer-type insertion portion 6 which detects the opening of the shutter 64, that the shutter 64 has been opened, and judges that a cash bag has been placed therein.

(S110) The MPU 9 uses the cassette reader/writer 76 to write the fact that the bag has been placed in the storing portion 54 of the cassette 50. For example, as shown in FIG. 19, the cumulative number of cash bags 92 within the cassette 50 and data for the placed cash bags 92 are written, and for confirmation, the storing portion 54 is read. Also, the drawer tray 61 is locked by the tray lock mechanism 63. Finally, the MPU 9 prints the store ID number and insertion date and time on a receipt using the receipt printer 62, and issues the receipt.

In this way, the operator sets a bag 92 in the drawer-type insertion portion 68 and pushes the drawer portion 68 inward to insert the bag, and the information of the inserted bag 92 is then read by the reader portion. The control portion accepts the bag only when there is a storing portion 94 on the bag, or if necessary, only when the data read from the bag matches data stored in advance in the storing portion of the equipment. Hence mischievous or mistaken insertion of objects can be prevented, and the trouble entailed by subsequent corrective action (separation of valid and invalid bags, and similar) can be averted.

An accepted bag 92 is placed in the cassette 50 below, and the control portion writes in the storing portion 54 of the cassette 50 that the bag 92 has been placed. Further, while the cassette 50 is set within the safe, the housing door is open and bags can be placed; but when the cassette 50 is to be removed, if the housing door is not closed, the cassette 50 cannot be removed. Consequently theft at the time of transport can be prevented.

Figure 20:
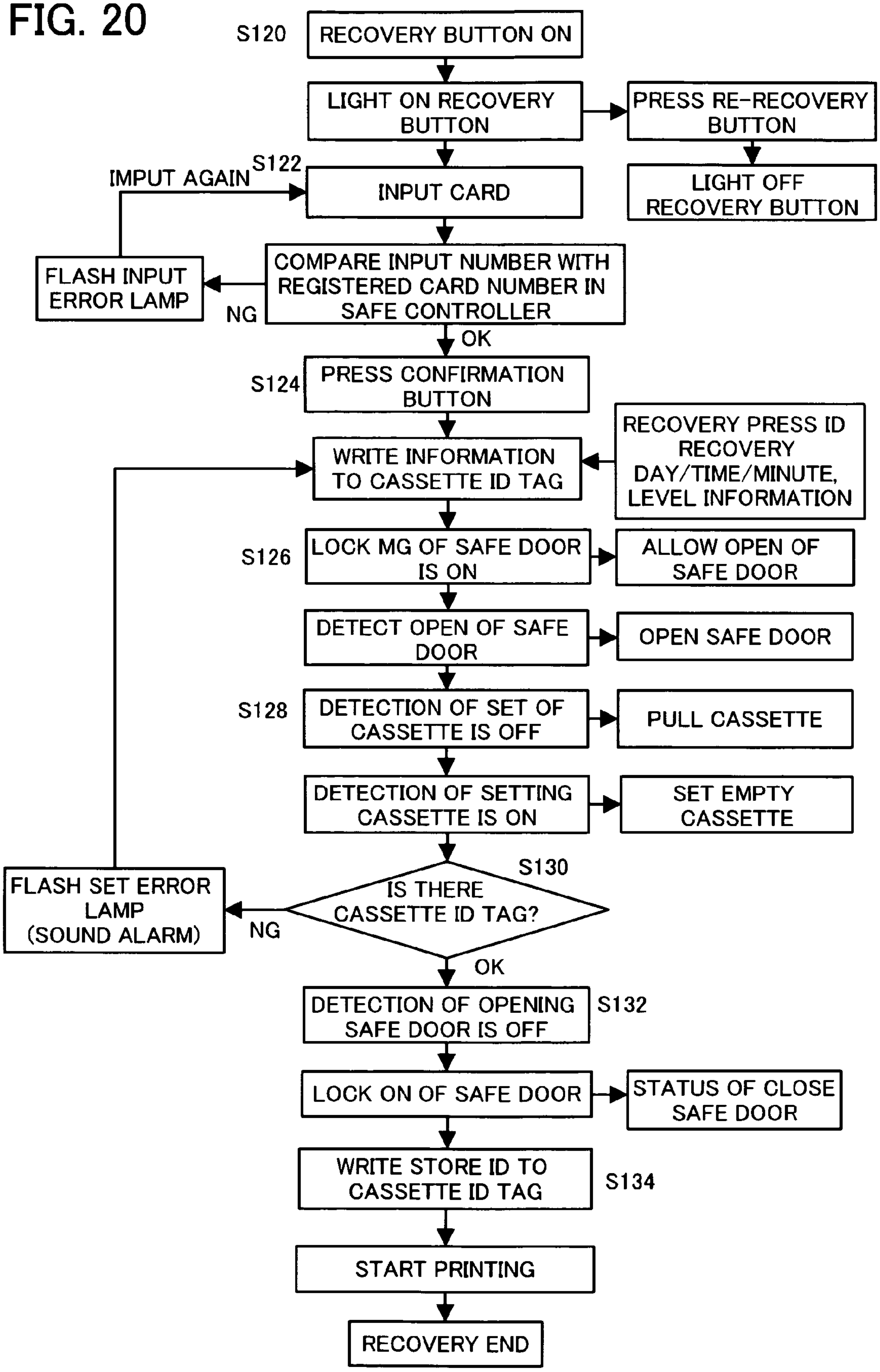
FIG. 20 shows the flow of cassette replacement processing in one embodiment of this invention; and, FIG. 21 explains a conventional store deposit system.
Figure 21:
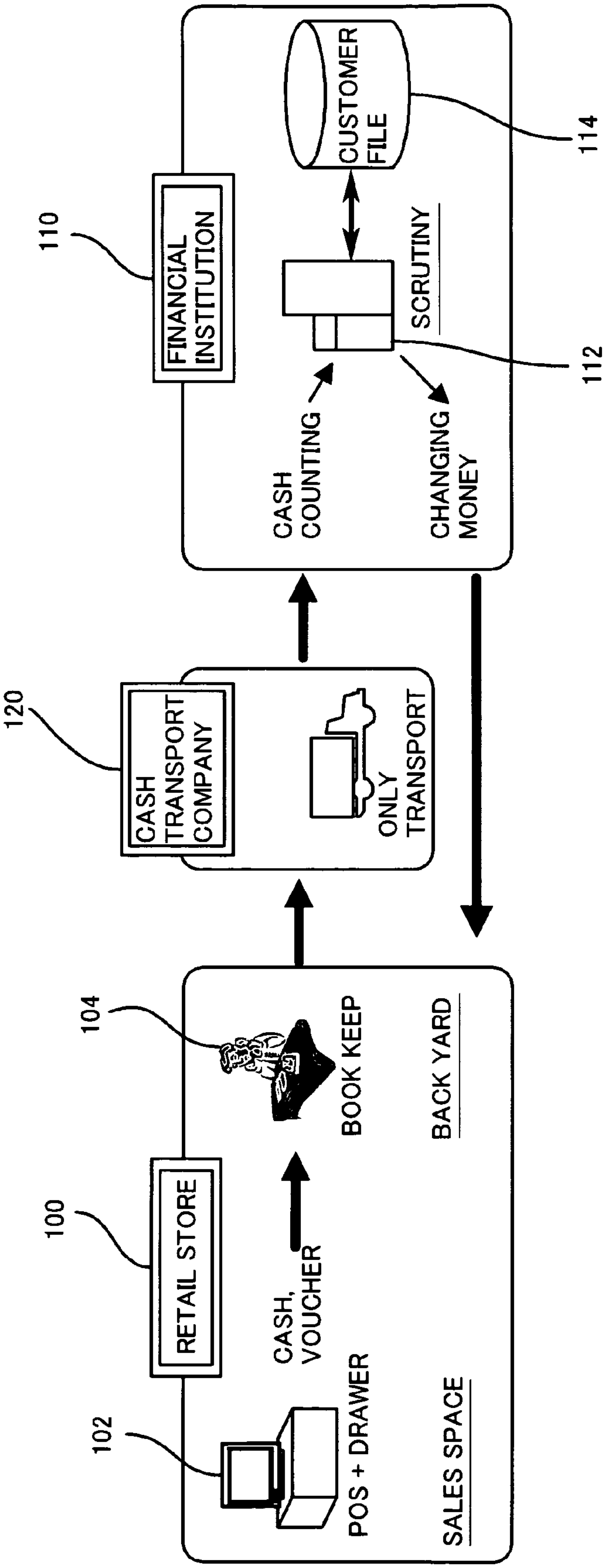
FIG. 21 PRIOR ART

Next, the flow of processing for cassette recovery (replacement) is explained in FIG. 20.

(S120) The MPU 9 detects that the recovery person has pressed the recovery button in the function key group 86, and initiates recovery processing. The MPU 9 lights the recovery button to notify the recovery person. If the recovery person again presses the recovery button, the recovery button is extinguished and processing ends.

(S122) Next, the MPU 9 receives the recovery person number input from the ID card of the recovery person by the card reader 80 or from the numeric keypad 82, compares the number with registered card numbers, and checks the validity of the recovery person ID number. The input recovery person ID number is displayed on the display portion, and if the number is invalid, the input error lamp flashes. In this case, the recovery person ID number can be input once again.

(S124) If the recovery person ID number is valid, the recovery person presses the confirmation key. The MPU 9 detects the pressing of the confirmation key, and writes the recovery person ID, recovery date and time, level information (previous recovery), and similar in the storing portion 54 of the cassette 50, via the reader/writer 76 of the cassette housing portion 7. As indicated in step S32 of FIG. 8, the recovery person may be made to input a password number, which is checked for validity by the control portion 9. The input password number is displayed on the display portion, and if invalid, the input error lamp flashes. In this case, a password number can again be input.

(S126) The MPU 9 releases the lock of the safe door 72 of the cassette housing portion 7 using the lock mechanism 77. By this means, the recovery person opens the safe door 72, as shown in FIG. 5 and FIG. 9. The MPU 9 detects the opening of the safe door 72 through the sensor 78 which detects opening of the safe door 72.

(S128) As shown in FIG. 9, the MPU 9 then detects, through the sensor 78, that the recovery person has pulled out and removed the cassette 50 from within the housing portion 7. At this time, the top-face door 52 of the cassette 50 is closed by the cassette lock mechanism 74. Then, the MPU 9 detects, through the sensor 78, that the recovery person has inserted and set in place an empty cassette 50 in the housing portion 7.

(S130) The reader/writer 76 of the housing portion 7 reads the information of the storing portion 54 of the cassette 50 inserted into the housing portion 7, and the control portion 9 detects whether there is a cassette ID tag 54. If necessary, a judgment can be made based on the data read (cassette ID) as to whether the cassette 50 matches data stored in advance in the storing portion of the equipment. If a cassette ID tag 54 is not detected, or if the cassette ID does not match, a cassette setting failure is judged, the indicator set error lamp flashes, and an alarm sounds. As a result, processing returns to step S126, and the cassette 50 can be pulled out. That is, only prescribed cassettes are accepted.

(S132) Next, the MPU 9 detects through the sensor 78 that the recovery person has closed the safe door 72. The MPU 9 then locks the safe door 72 using the lock mechanism 77 of the cassette housing portion 7.

(S134) The MPU 9 writes the store ID number and recovery person ID number in the storing portion 54 of the cassette 50, using the cassette reader/writer 76 of the housing portion 7. Finally, the receipt printer 62 prints the recovery person ID number, store ID number, and recovery date and time on a receipt, and issues the receipt.

In this way, recovery entails only replacement of the cassette 50, and the danger of failure to recover a cash bag (a cash bag being left behind) is eliminated. Information on the bags inside is stored in the cassette 50, and after removal of the cassette 50, opening is only possible by specified persons, using a key or similar means, so that theft during transport can be prevented. Because data is also stored in the storing portions 94 of the bags 92, the cassette 50 can be delivered and bookkeeping tasks can be outsourced securely.

Other Embodiments

In the above-described embodiments, the cassette storing portion was described as a wireless IC tag; but other storing media, such as for example optical storing media or magnetic storing media, can be applied. Also, as the data to be written to the storing portions 94 of the cash bags 92 and to the storing portion of the cassette 50, in essence it is sufficient that the state of the bags (the number of bags and contents) within the cassette 50 be known, and other data configurations can be adopted. Similarly, POS terminals are not limited to the single-function POS terminals of these embodiments, but may also be capable of so-called merchandise registration processing.

This invention has been explained in terms of preferred embodiments, but various modifications to the invention are possible within the scope of the invention, and such modifications are not excluded from the scope of the invention.

Thus in a safe for deposits of this invention, recovery entails only cassette attachment and removal operations, and the danger of failure to recover a cash bag (a cash bag being left behind) is eliminated. Also, because information (number of bags and similar) of the housed cash bags is stored in a cassette, checks of cash bags can be performed. Further, because a cassette cannot be opened, theft during transport can be prevented.

Moreover, at the time of insertion into the safe, only receivable bags are selected and received, so that mistaken insertion does not occur, and the trouble entailed by subsequent corrective action can be eliminated.

Consequently it is possible to reliably outsource bookkeeping operations, and the burden of deposit processing for a store can be alleviated.

What is claimed is:

1. A safe for deposits, into which a sealed bag containing cash is inserted and which houses said bag, comprising:

a bag insertion portion, having a receiving portion which receives the inserted bag and a reader which reads information of a storing portion of said bag in said receiving portion;

a cassette housing portion which houses a replaceable cassette for placing therein the bag inserted into said receiving portion and having a storing portion; and a control portion which judges whether the bag can be received through said read information by said reader of said bag insertion portion, and places the receivable bag in said cassette when judging said bag is received, and wherein said control portion writes information for said placed bags to the storing portion of said cassette by using a writing portion of said cassette housing portion.

2. The safe for deposits according to claim 1, wherein said bag insertion portion further comprises a shutter mechanism for placing said bag in said cassette from said receiving portion, and said control portion operates said shutter mechanism to place said receivable bag in said cassette.

3. The safe for deposits according to claim 1, further comprising:

an input portion for input of identification data of a person who inserted said bag; and a lock mechanism to lock said bag insertion portion, and wherein said control portion judges the validity of said input identification information and releases the lock of said lock mechanism.

4. The safe for deposits according to claim 1, wherein said cassette has a door covering an aperture for receiving said bag from said receiving portion, and said cassette housing portion has a cassette lock mechanism to open said door of said inserted cassette.

5. The safe for deposits according to claim 4, wherein said cassette lock mechanism closes said door when said cassette is removed from said cassette housing portion.

6. A safe for deposits, into which a sealed bag containing cash is inserted and which houses said bag, comprising:

a bag insertion portion, having a receiving portion which receives the inserted bag and a reader which reads information of a storing portion of said bag in said receiving portion;

a cassette housing portion which houses a replaceable cassette for placing therein the bag inserted into said receiving portion and having a storing portion; and a control portion which judges whether the bag can be received through said read information by said reader of said bag insertion portion, and places the receivable bag in said cassette, and wherein said control portion writes information for said placed bags to the storing portion of said cassette by using a writing portion of said cassette housing portion, wherein said bag insertion portion is constructed to be pulled out such that said receiving portion can receive said bag in the vertical direction, and said control portion, after said bag insertion portion has been pulled out, detects the return of said bag insertion portion, and receives said read information from said reader.

7. A method of control of a safe for deposits, into which a sealed bag containing cash is inserted and which houses said bag, comprising the steps of:

reading information of a storing portion of said bag inserted into a bag insertion portion which receives said bag;

judging whether the bag can be received, based on said read information;

placing the receivable bag in a cassette having a storing portion when judging said bag is received; and writing the information of said placed bag to the storing portion of said cassette by using a writing portion of said cassette housing portion.

8. The method of control of a safe for deposits according to claim 7, wherein said placing step comprises a step of operating a shutter mechanism to place said bag in said cassette from said insertion portion, and placing said receivable bag in said cassette.

9. The method of control of a safe for deposits according to claim 7, further comprising:

an input step of inputting identification data of a person who inserted said bag; and a step of judging the validity of said input identification data and of releasing the lock of a lock mechanism of said bag insertion portion.

10. The method of control of a safe for deposits according to claim 7, further comprising a step of opening a door covering an aperture in said cassette to receive said bag from said bag insertion portion, upon insertion of said cassette in said cassette housing portion.

11. The method of control of a safe for deposits according to claim 10, further comprising a step of closing said door when said cassette is removed from said cassette housing portion.

12. A method of control of a safe for deposits into which a sealed bag containing cash is inserted and which houses said bag, comprising the steps of:

reading information of a storing portion of said bag inserted into a bag insertion portion which receives said bag:

judging whether the bag can be received, based on said read information;

placing the receivable bag in a cassette having a storing portion; and writing the information of said placed baa to the storing portion of said cassette by using a writing portion of said cassette housing portion, wherein said reading step comprises:

a step of detecting, after the pulling-out of said bag insertion portion which can be pulled out in order to receive said bag in the vertical direction, the return of said bag insertion portion; and a step of reading said read information from said reader.

13. A deposit system, utilizing a safe for deposits into which a sealed bag containing cash is inserted and which houses said bag, comprising:

said safe for deposits comprising:

a bag insertion portion, having a receiving portion to receive the inserted bag and a reader which reads information of a storing portion of said bag in said receiving portion;

a cassette housing portion which houses a replaceable cassette for placing therein the bag inserted into said receiving portion and having a storing portion; and, a control portion which judges whether the bag can be received through said read information from said reader of said bag insertion portion, places the receivable bag in said cassette, and writes information on said placed bag in a storing portion of said cassette, and a scrutiny processing device which reads the information of said storing portion of said transported cassette and the information of the storing portion of said bag within said cassette and performs scrutiny processing.

14. The deposit system according to claim 13, wherein said bag insertion portion further comprises a shutter mechanism for placing said bag in said cassette from said receiving portion, and said control portion operates said shutter mechanism to place said receivable bag in said cassette.

15. The deposit system according to claim 13, wherein said bag insertion portion is constructed to be pulled out such that said receiving portion can receive said bag in the vertical direction, and said control portion, after said bag insertion portion has been pulled out, detects the return of said bag insertion portion, and receives said read information from said reader.

16. The deposit system according to claim 13, wherein said safe for deposits further comprises:

an input portion for input of identification data of a person who inserted said bag; and a lock mechanism to lock said bag insertion portion, and wherein said control portion judges the validity of said input identification information and releases the lock of said lock mechanism.

17. The deposit system according to claim 13, wherein said cassette has a door covering an aperture for receiving said bag from said receiving portion, and said cassette housing portion has a cassette lock mechanism to open said door of said inserted cassette.

18. The deposit system according to claim 17, wherein said cassette lock mechanism closes said door when said cassette is removed from said cassette housing portion.

19. A deposit processing method, comprising:

a step of reading information of a storing portion of a sealed bag containing cash, which has been inserted into a bag insertion portion which receives said bag;

a step of judging whether the bag can be received based on said read information;

a step of placing the receivable bag in a cassette having a storing portion;

a step of writing, in the storing portion of said cassette, information for said placed bag; and a scrutiny processing step of reading the information of said storing portion of said removed cassette and the information of the storing portion of said bag within said cassette, and of performing scrutiny processing.

20. The deposit processing method according to claim 19, wherein said placing step comprises a step of operating a shutter mechanism for placing said bag in said cassette from said insertion portion, and placing said receivable bag in said cassette.

21. The deposit processing method according to claim 19, wherein said reading step comprises:

a step of detecting, after the pulling-out of said bag insertion portion which can be pulled out so as to receive said bag in the vertical direction, the returning of said bag insertion portion; and a step of reading said read information from said reader.

22. The deposit processing method according to claim 19, further comprising:

an input step of inputting identification data of a person who inserted said bag; and a step of judging the validity of said input identification data and of releasing the lock of a lock mechanism of said bag insertion portion.

23. The deposit processing method according to claim 19, further comprising a step of opening a door covering an aperture of said cassette for receiving said bag from said bag insertion portion, in response to the insertion into a cassette housing portion of said cassette.

24. The deposit processing method according to claim 23, further comprising a step of closing said door when said cassette is removed from said cassette housing portion.

* * * * *